(12) United States Patent
Takatsuji et al.

(10) Patent No.: US 7,933,485 B2
(45) Date of Patent: Apr. 26, 2011

(54) AUDIO-VIDEO OUTPUT DEVICE, AUDIO OUTPUT DEVICE, AUDIO-VIDEO REPRODUCTION DEVICE, AUDIO-VIDEO DATA REPRODUCTION SYSTEM, AND AUDIO-VIDEO DATA REPRODUCTION METHOD

(75) Inventors: Ayako Takatsuji, Osaka (JP); Junji Yoshida, Osaka (JP); Akifumi Sakamoto, Osaka (JP); Yoshifumi Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 196 days.

(21) Appl. No.: 12/518,769

(22) PCT Filed: Dec. 13, 2007

(86) PCT No.: PCT/JP2007/074032
§ 371 (c)(1),
(2), (4) Date: Jun. 11, 2009

(87) PCT Pub. No.: WO2008/072695
PCT Pub. Date: Jun. 19, 2008

(65) Prior Publication Data
US 2011/0052141 A1    Mar. 3, 2011

(30) Foreign Application Priority Data
Dec. 14, 2006    (JP) .................................. 2006-337532

(51) Int. Cl.
*H04N 5/775*    (2006.01)
*H04N 9/80*    (2006.01)
(52) U.S. Cl. ........................................ 386/230; 386/248
(58) Field of Classification Search .............. 386/45–46, 386/94–98, 123
See application file for complete search history.

(56) References Cited

U.S. PATENT DOCUMENTS

| 2006/0012710 A1 | 1/2006 | Sasaki |
| 2006/0222344 A1 | 10/2006 | Ukai et al. |
| 2006/0280439 A1 | 12/2006 | Ukai et al. |

(Continued)

FOREIGN PATENT DOCUMENTS

EP    1 816 868    8/2007

(Continued)

OTHER PUBLICATIONS

International Search Report issued Mar. 25, 2008 in the International (PCT) Application No. PCT/JP2007/074032 of which the present application is the U.S. National Stage.

(Continued)

*Primary Examiner* — Thai Tran
*Assistant Examiner* — Nigar Chowdhury
(74) *Attorney, Agent, or Firm* — Wenderoth, Lind & Ponack, L.L.P.

(57) ABSTRACT

In the case where (i) audio-video data is unidirectionally transmitted between any device, where (ii) control messages are bidirectionally transmitted between all of the devices, and where (iii) a connection between the devices for transmitting and receiving the audio-video data becomes valid when unidirectional transmission of audio reproduction capability information of the reception device from the data reception device to the data transmission device becomes available, the TV (31) includes the audio reproduction capability information of the AV amplifier (21) to the control message and transmits the control message to the DVD recorder (10) (30M3), and in the case where the DVD recorder (10) and the TV (31) are connected such that the audio-video data is unidirectionally transmitted from the DVD recorder (10) to the TV (31), and where the TV (31) and the AV amplifier (21) are connected such that the audio data is output from the TV (31) to the AV amplifier (21) through another network, the TV (31) does not re-transmit the audio reproduction capability information to the DVD recorder (10) using the unidirectional transmission when transmitting the control message.

6 Claims, 14 Drawing Sheets

U.S. PATENT DOCUMENTS

2007/0230909 A1 10/2007 Mukaide et al.
2008/0080596 A1 4/2008 Inoue et al.

FOREIGN PATENT DOCUMENTS

| JP | 2006-33436 | 2/2006 |
|---|---|---|
| JP | 2006-287364 | 10/2006 |
| JP | 2006-339901 | 12/2006 |
| JP | 2007-267116 | 10/2007 |
| WO | 2006/057324 | 6/2006 |

OTHER PUBLICATIONS

High-Definition Multimedia Interface Specification Version 1.3a, Nov. 10, 2006.

AUDIO-VIDEO OUTPUT DEVICE, AUDIO OUTPUT DEVICE, AUDIO-VIDEO REPRODUCTION DEVICE, AUDIO-VIDEO DATA REPRODUCTION SYSTEM, AND AUDIO-VIDEO DATA REPRODUCTION METHOD

TECHNICAL FIELD

The present invention relates to a method for switching an audio output format used for the audio data output from an audio reproduction device, which is an output source of audio data, to an audio output device in a network such as a home entertainment network where audio-video data is transmitted via unidirectional data connection and control messages are transmitted and received bidirectionally, between devices.

BACKGROUND ART

In recent years, practical use of a home network where digital devices at home are mutually connected such that users can enjoy contents of high image quality and high audio quality have been turning into reality. For example, the High-Definition Multimedia Interface (HDMI) which was standardized in December 2002, is a standard for digital audio-video input/output interface used in next generation audio-visual (AV) devices. The standard allows transmission of audio, video, and controls signals with one cable (for example, see Non-Patent Reference 1).

The HDMI standard defines Consumer Electronics Control (CEC) as a protocol for transmitting the control signals bidirectionally. The CEC protocol allows controlling multiple AV devices with one remote-controller by relaying the control signals among devices. To put it differently, bidirectional transmission of the control signals among a television (TV), an AV amplifier, and a DVD player/recorder allows controlling the entire home theater with one remote controller.

The HDMI standard has features including, not only preventing deterioration of the signals by digital transmission, but preventing unauthorized copying. In order to achieve the feature, reproduction devices such as the DVD player/recorder read the reproduction capability of a connected device to adjust output format of the audio-video data and encrypts the audio-video data and transmits the encrypted data.

The reproduction capability information is transmitted from a device such as a TV or an AV amplifier having an HDMI input port (hereinafter referred to as "HDMI input device") to the connected device (hereinafter referred to as "HDMI output device") using a Display Data Channel (DDC) bus which is a unidirectional data connection. The DDC is a standard by the Video Electronics Standards Association (VESA) defining a function to transmit information such as type information of a display to the connected device in order to implement plug and play of the display. The type information of the display and the audio formats and video formats that are supported are stored in the memory in the HDMI input device as Enhanced Extended Display Identification Data (EDID). The EDID is read from the HDMI output device connected to the DDC bus via the DDC bus in response to switching of the Hot Plug Detect Signal (HPD) from low to high (or an HPD pulse) by the HDMI input device. When the HPD is high, the HDMI output device can read the EDID of the HDMI input device, and this suggests that the HDMI input device such as the TV or the AV amplifier has a capability to reproduce the digital audio-video data in the audio-video format indicated by the EDID.

Meanwhile, the HDMI standard also adopts the High-bandwidth Digital Content Protection System (HDCP) which is an authentication protocol for confirming, when outputting the contents that require copyright protection, that the connected device is valid. The HDCP defines that the authentication starts in response to the switching of the HPD from low to high (or an HPD pulse).

The function to adjust the data output format after the reproduction device reads the reproduction capability information of the connected device is useful. However, there is a disadvantage that each time the audio reproduction capability changes due to a change in the device to output audio (speakers) among the HDMI output devices connected to the reproduction devices, for example, the HDMI output device connected to the reproduction device switches the reproduction capability information read by the reproduction device, so that the reproduction device outputs the appropriate audio data.

FIG. 1 illustrates an example configuration of an HDMI connection.

For example, the DVD recorder 10, the AV amplifier 20, and the TV 30 are connected.

The DVD recorder 10 includes one HDMI output port (10PO_1), the AV amplifier 20 includes one HDMI input port (20PI_1) and one HDMI output port (20PO_1), and the TV 30 includes one HDMI input port (30PI_1).

The DVD recorder 10, the AV amplifier 20, and the TV 30 are respectively connected via the HDMI, and the audio-video data is transmitted unidirectionally from (10PO_1), (20PI_1), (20PO_1), and to (30PI_1), in that order. The control messages are transmitted bidirectionally on the control signal bus of the HDMI. Here, regarding audio output, it is assumed that the AV amplifier 20 is capable of outputting 5.1-channel Pulse Code Modulation (PCM), the TV 30 only supports 2-channel PCM output, and the DVD recorder 10 reproduces DVD video contents compliant with 5.1-channel digital surround. A state where the TV 30 outputs both the video and the audio is referred to as a "television mode", and a state where the TV 30 outputs the video and the AV amplifier 20 outputs the audio is referred to as a "theater mode". The TV 30 instructs the AV amplifier 20 to switch the television mode and the theater mode via the CEC protocol, using the device operation by the user as a trigger for the switching. However, detailed explanation is omitted since the switching is not a focus of the present invention.

FIG. 2 illustrates an example of audio output in the television mode.

Since the TV 30 can only reproduce audio in 2-channel PCM, the audio reproduction capability information 30C1 described on EDID 30C of the TV 30 is set as follows, for example, "audio type=PCM, the maximum number of channels=2". The EDID 30C sets sampling frequency and the number of quantized bits that are supported, and regarding the video, supported types of the video formats as the reproduction capability information, however, detailed explanation is omitted since they are not the focus of the present invention. The HPD signal 30P which is outputted by the TV 30 to the AV amplifier 20 is set to be high.

Here, in the case of the television mode where the TV 30 outputs both audio and video, the audio reproduction capability information 20C1 described in the EDID 20C of the AV amplifier 20 is set as "audio type=PCM, the maximum number of channels=2", adjusted to the audio reproduction capability information 30C1 of the TV 30, which has been read out of the TV 30. Although the AV amplifier 20 is capable of performing 5.1-channel surround reproduction, when the reproduction of 2 channels or more is set in the audio reproduction capability information 20C1, the TV 30 that can only reproduce the 2-channel PCM cannot reproduce the audio properly upon multi-channel audio reproduction from the DVD recorder 10. The HPD signal 20P which is outputted by the AV amplifier 20 to the DVD recorder 10 is set to be high.

The DVD recorder 10 reads the EDID 20C from the AV amplifier 20, and transmits the audio in 2-channel PCM that the TV 30 can output, based on the audio reproduction capability information 20C1.

FIG. 3 shows a conventional example of the audio-video data reproduction method in the HDMI connection.

During the television mode where the TV 30 outputs the audio and the video, the audio reproduction capability information 30C1 of the TV 30 and the audio reproduction capability information 20C1 of the AV amplifier 20 are same as those shown in FIG. 2.

Here, when switching to the theater mode where the AV amplifier 20 outputs the audio (30H), the audio output from the AV amplifier 20 is limited to 2 channels if the audio reproduction capability information 20C1 of the AV amplifier 20 remains unchanged from the television mode. Thus, the AV amplifier 20 temporarily switches the HPD signal 20P to low (20P_L), sets the audio reproduction capability information 20C2 indicating that the AV amplifier 20 is capable of 5.1-channel reproduction (for example, "audio type=PCM, and the maximum number of channels=6), and switches the HPD signal 20P to high (20P_H) again.

When the HPD signal 20P is switched from low (20P_L) to high (20P_H), the DVD recorder 10 determines, compliant with the HDCP, that there is a possible change in the HDMI connection status, and starts authentication again in order to confirm that the connected device is valid or not. When starting the authentication, the DVD recorder 10 stops outputting the audio-video data, reads the EDID 20C from the AV amplifier 20 again, and confirms whether the AV amplifier 20 is valid or not while transmitting video signals that does not require contents protection (for example, blackouts). Subsequently, when the AV amplifier 20 is confirmed as valid, the DVD recorder 10 starts outputting the audio-video data again, and with regard to the audio, the DVD recorder 10 starts outputting the audio in the audio reproduction format that the AV amplifier 20 is capable of reproducing, indicated by the audio reproduction capability information 20C2 of the AV amplifier 20. Detailed explanation for the HDCP authentication is omitted since it is not the focus of the present invention.

Another example with a different HDMI connection configuration is described as follows.

FIG. 4 illustrates an example configuration of the HDMI connection.

For example, it is assumed that the DVD recorder 10, the AV amplifier 21, and the TV 31 are connected.

The AV amplifier 21 includes one HDMI output port (21PO_1) and one optical digital audio input (21PI_1), and the TV 31 includes two HDMI input ports (31PI_1, 31PI_2), and one optical digital output (30PO_1).

The configuration in FIG. 4 is different from the configuration in FIG. 1 in that the DVD recorder 10 is connected to the HDMI input port (31PI_1) in the TV 31 instead of the AV amplifier 21, and the optical audio digital cable connects the TV 31 and the AV amplifier 21.

The audio-video data is unidirectionally transmitted from (10PO_1) to (31PI_1). The audio data is further transmitted from (31PO_1) to (21PI_1). The control messages are bidirectionally transmitted on the control signal bus of the HDMI. Here, it is assumed that regarding of audio output, the AV amplifier 21 is capable of outputting 5.1-channel compressed audio (for example, Dolby Digital (registered trademark) audio), and the TV 31 only supports 2-channel PCM output.

FIG. 5 illustrates an example of audio output in the television mode.

Since the TV 31 can only reproduce audio in 2-channel PCM, the audio reproduction capability information 31C1 contained in the EDID 31C of the TV 31 is specified as follows, for example, "audio type=PCM, the maximum number of channels=2". The HPD signal 31P which is outputted by the TV 31 to the DVD recorder 10 is set to be high.

The DVD recorder 10 reads the EDID 31C of the TV 31, and transmits the audio in 2-channel PCM that the TV 31 can output, based on the audio reproduction capability information 31C1.

FIG. 6 shows a conventional example of the audio-video data reproduction method in the HDMI connection.

During the television mode where the TV 31 outputs the audio and the video, the audio reproduction capability information 31C1 in the TV 31 is same as the one shown in FIG. 5.

Here, when switching the audio to the theater mode where the AV amplifier 21 outputs the audio (31H), the audio output from the AV amplifier 21 is limited to 2 channels if the audio reproduction capability information 31C1 in the TV 31 remains unchanged, since the audio output from the DVD recorder remains in the 2-channel PCM.

Thus, the TV 31 temporarily switches the HPD signal 31P to low (31P_L), sets the audio reproduction capability information 31C2 indicating that the AV amplifier 21 is capable of 5.1-channel reproduction (for example, "audio type=Dolby Digital, and the maximum number of channels=6"), and switches the HPD signal 31P to high (31P_H) again.

When the HPD signal 31P is switched from low (31P_L) to high (31P_H), the DVD recorder 10 determines, compliant with the HDCP, that there is a possible change in the HDMI connection status in the same manner as the example in FIG. 3, and starts authentication again in order to confirm that the connecting device is valid or not. When starting the authentication, the DVD recorder 10 stops outputting the audio-video data, reads the EDID 31C of the TV 31 again, and confirms whether the TV 31 is valid or not while transmitting video signals that does not require contents protection (for example, blackouts). Subsequently, when the TV 31 is confirmed as valid, the DVD recorder 10 starts outputting the audio-video data again, and with regard to the audio, the DVD recorder 10 starts outputting the audio in the audio reproduction format that the AV amplifier 21 is capable of reproducing, indicated by the audio reproduction capability information 31C2 of the TV 31.

Non-Patent Reference 1: High-Definition Multimedia Interface Specification Version 1.3

DISCLOSURE OF INVENTION

Problems that Invention is to Solve

However, with the conventional audio-video data reproduction method, when the audio-video output (content) is stopped and the HDCP authentication is performed for switching the output audio, there is a problem that there is a period of time, or a few seconds, where it is unable to view the content, before outputting the audio-video data again.

The present invention has been conceived in order to solve the problem above, and it is an object of the present invention to provide an audio-vide output device, an audio output device, an audio-video reproduction device, an audio-video data reproduction system, and an audio-video data reproduction method capable of reducing the interruption of the audio-video data caused by the re-authentication of the connected device when switching the output audio.

Means to Solve the Problems

In order to solve the abovementioned problem, the audio-video data reproduction system according to the present invention is an audio-video data reproduction system including: an audio-video reproduction device which reproduces audio data and video data; an audio output device which is capable of outputting the audio data reproduced by the audio-video reproduction device; and an audio-video output device capable of outputting the audio data and the video data reproduced by the audio-video reproduction device, in which the audio-video reproduction device, the audio output device, and the audio-video output device are connected to one another via a network, in the network: (i) the audio data and the video data are unidirectionally transmitted from any given data transmission device to any given data reception device; (ii) a control message is bidirectionally transmitted between all of the devices; and (iii) a connection between the devices for transmitting and receiving the audio data and the video data becomes valid when unidirectional transmission of audio reproduction capability information of the data reception device from the data reception device to the data transmission device becomes available, the audio-video output device includes: an audio reproduction capability inquiry unit which inquires, from the audio output device, audio reproduction capability information of the audio output device and to acquire the audio reproduction capability information; an audio-video output device side control message transmission unit which includes, to the control message, the audio reproduction capability information of the audio output device and information setting whether audio reproduction capability indicated by the audio reproduction capability information is used or not, and to transmit the control message to the audio-video reproduction device, and the audio-video output device side control message transmission unit further includes, to the control message, information setting whether the audio reproduction capability information using unidirectional transmission is switched or not, and to transmit the control message to the audio output device, the audio output device includes: an audio output device side control message transmission unit which includes, to the control message, the audio reproduction capability information of the audio output device and information indicating whether the audio reproduction capability information by the unidirectional transmission is switched or not, and to transmit the control message to the audio-video output device; and an audio output device side control message reception unit which receives the control message including the information setting whether the audio reproduction capability information by the unidirectional transmission is switched or not, and the audio-video reproduction device includes: an audio-video reproduction device side control message reception unit which receives the control message including the audio reproduction capability information of the audio output device and the information setting whether the audio reproduction capability information is used or not; and a reproduction unit which reproduces the audio data and the video data, when, in the network, the audio-video reproduction device, the audio output device, and the audio-video output device are connected in such a manner that (i) the audio data and the video data are unidirectionally transmitted from the audio-video reproduction device to the audio output device, and that (ii) the audio data and the video data are unidirectionally transmitted from the audio output device to the audio-video output device, the audio output device prohibits re-transmitting the audio reproduction capability information using the unidirectional transmission, when the audio output device side control message reception unit receives the control message transmitted by the audio-video output device side control message transmission unit, indicating that the audio reproduction capability information by the unidirectional transmission is not switched, in the case where, (i) in the network, the audio-video reproduction device and the audio-video output device are connected in such a manner that the audio data and the video data are unidirectionally transmitted from the audio-video reproduction device to the audio-video output device, and where (ii) the audio-video output device and the audio output device are connected in such a manner that the audio data is output from the audio-video output device to the audio output device through a network different from the network, the control message transmission unit prohibits re-transmitting the audio reproduction capability information using the unidirectional transmission when transmitting the control message, and the reproduction unit reproduces the audio data in accordance with the audio reproduction capability information included in the control message received from the audio-video output device, when the audio-video reproduction device side control message reception unit receives the control message indicating that the audio reproduction capability information is used, instead of the audio reproduction capability information received from the audio-video output device through the unidirectional transmission.

The audio reproduction capability is transmitted to the audio-video reproduction device with the control message. Accordingly, it is possible switch the format of the audio reproduced by the audio-video reproduction device regardless of the audio reproduction capability which is read by unidirectional transmission.

Furthermore, specifying that the audio output device does not switch the audio reproduction capability with the setting information included in the control message, it is not necessary for the audio output device to cause the audio-video reproduction device to read the audio reproduction capability. Therefore, it is possible to avoid the suspension (interruption) of the video caused by the re-authentication necessitated by the change in the audio reproduction capability.

EFFECTS OF THE INVENTION

The present invention can provide an audio-video output device, an audio output device, an audio-video reproduction device, an audio-video data reproduction system, and an audio-video data reproduction method capable of reducing the interruption of the audio-video data that has been occurred with the conventional technology.

NUMERICAL REFERENCES

10 DVD recorder
20, 21 AV amplifier
30, 31 Television
20P, 30P 20P_L, 20P_H, 31P HPD signal
20C1, 30C1, 20C2 Audio reproduction capability information

BEST MODE FOR CARRYING OUT THE INVENTION

Embodiments of the audio-video data reproduction method according to the present invention will be hereafter described in detail with reference to the drawings.

First Embodiment

In the audio-video data reproduction method according to the first embodiment of the present invention, instructions and notifications using control messages specify the audio format that the audio-video reproduction device is capable of outputting. An audio output device does not switch the data reproduction capability information read by the audio-video reproduction device even when audio reproduction capability changes due to a change in the audio output device among the HDMI output devices connected to the audio-video reproduction device. Accordingly, it is not necessary for the audio output device to switch an HPD signal to the audio-video reproduction device from low to high (send a pulse), and there is no need for the audio-video reproduction device to perform an HDCP authentication again. Thus, the audio output device can let the audio-video reproduction device to switch the transmission to appropriate audio data without an interruption of the video.

Figure 7:
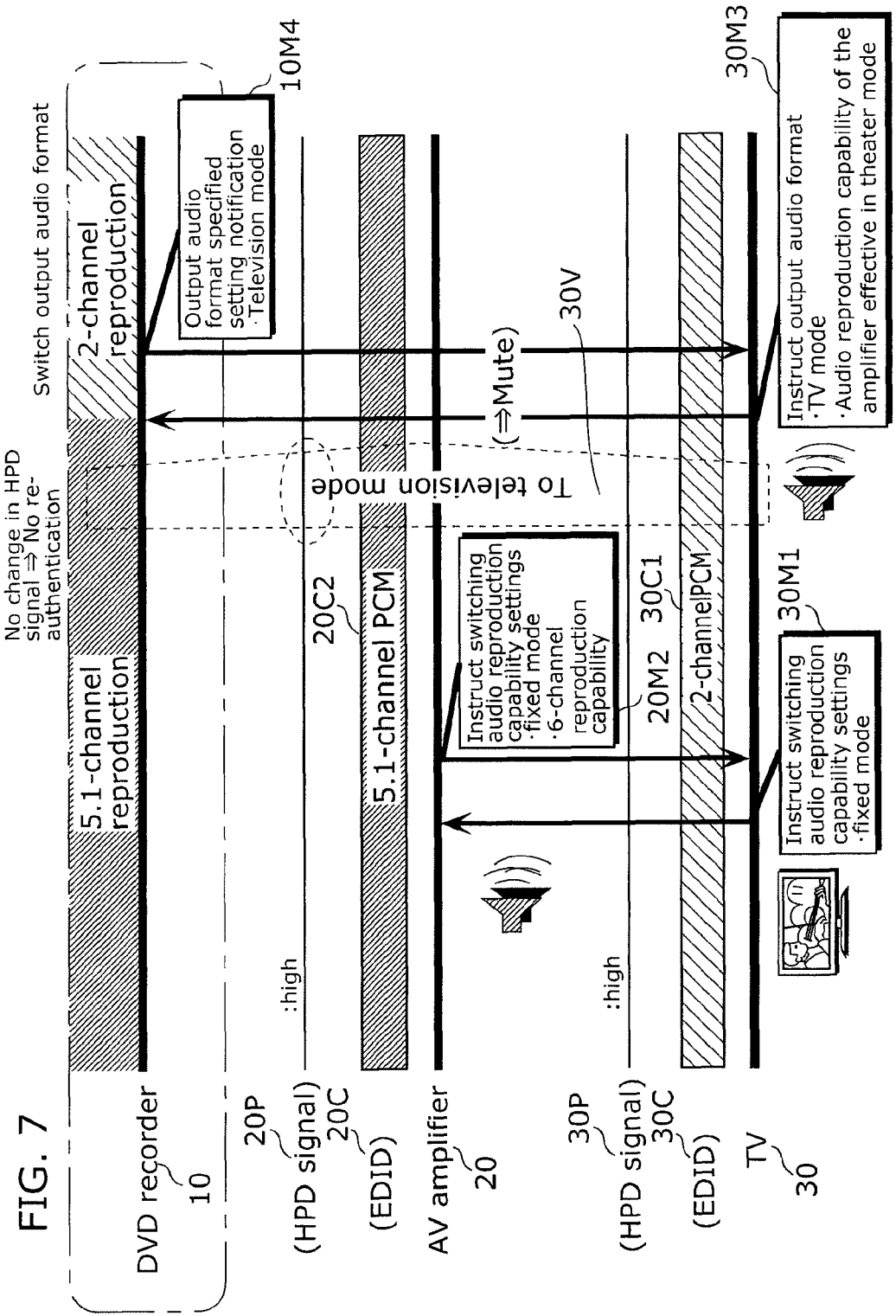
FIG. 7 shows an example of the audio-video data reproduction method in the HDMI connection according to the first embodiment of the present invention.

FIG. 7 shows an example of the audio-video data reproduction method in the HDMI connection according to the first embodiment of the present invention.

Figure 1:
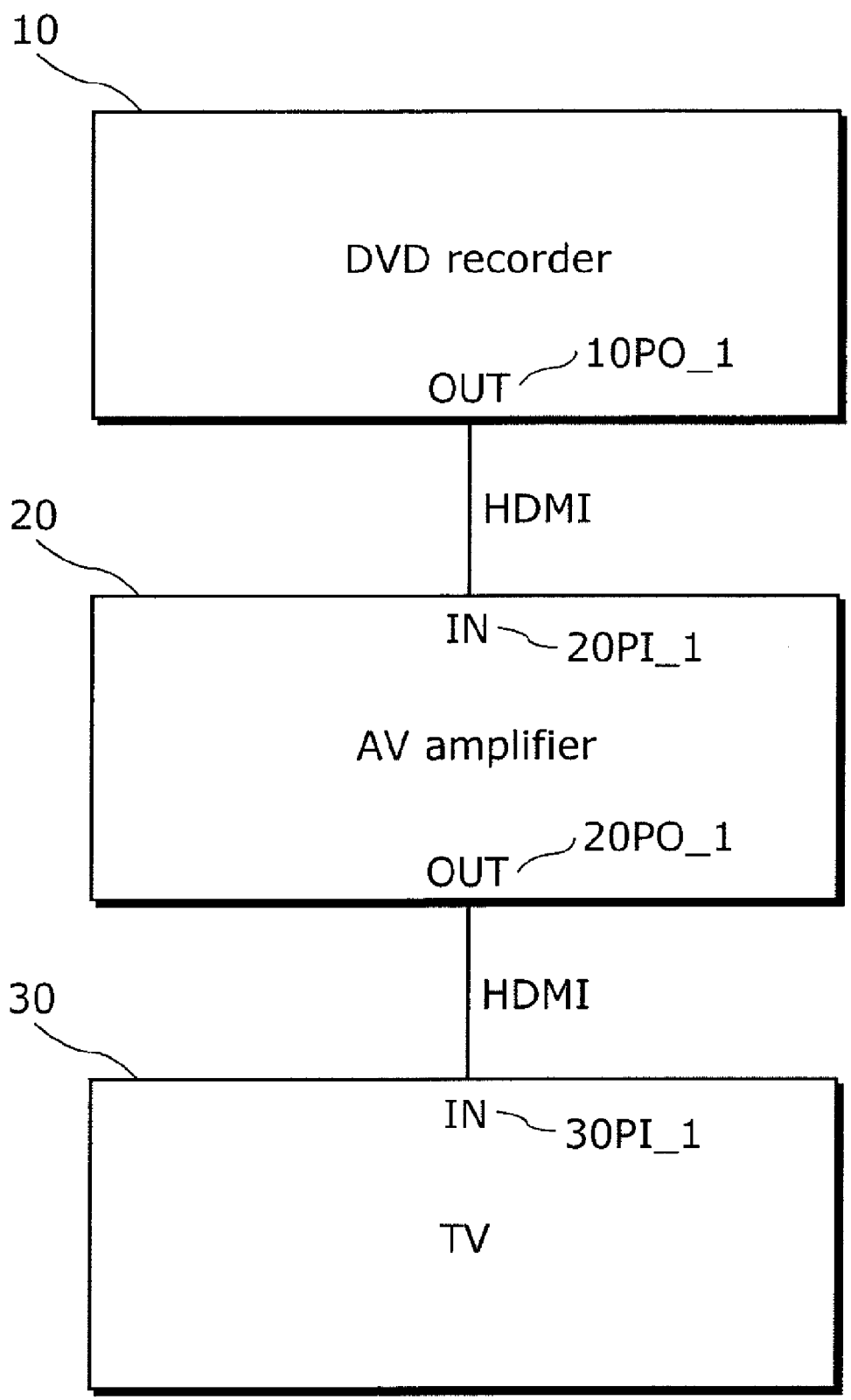
FIG. 1 shows an example configuration of an HDMI connection.
Figure 2:
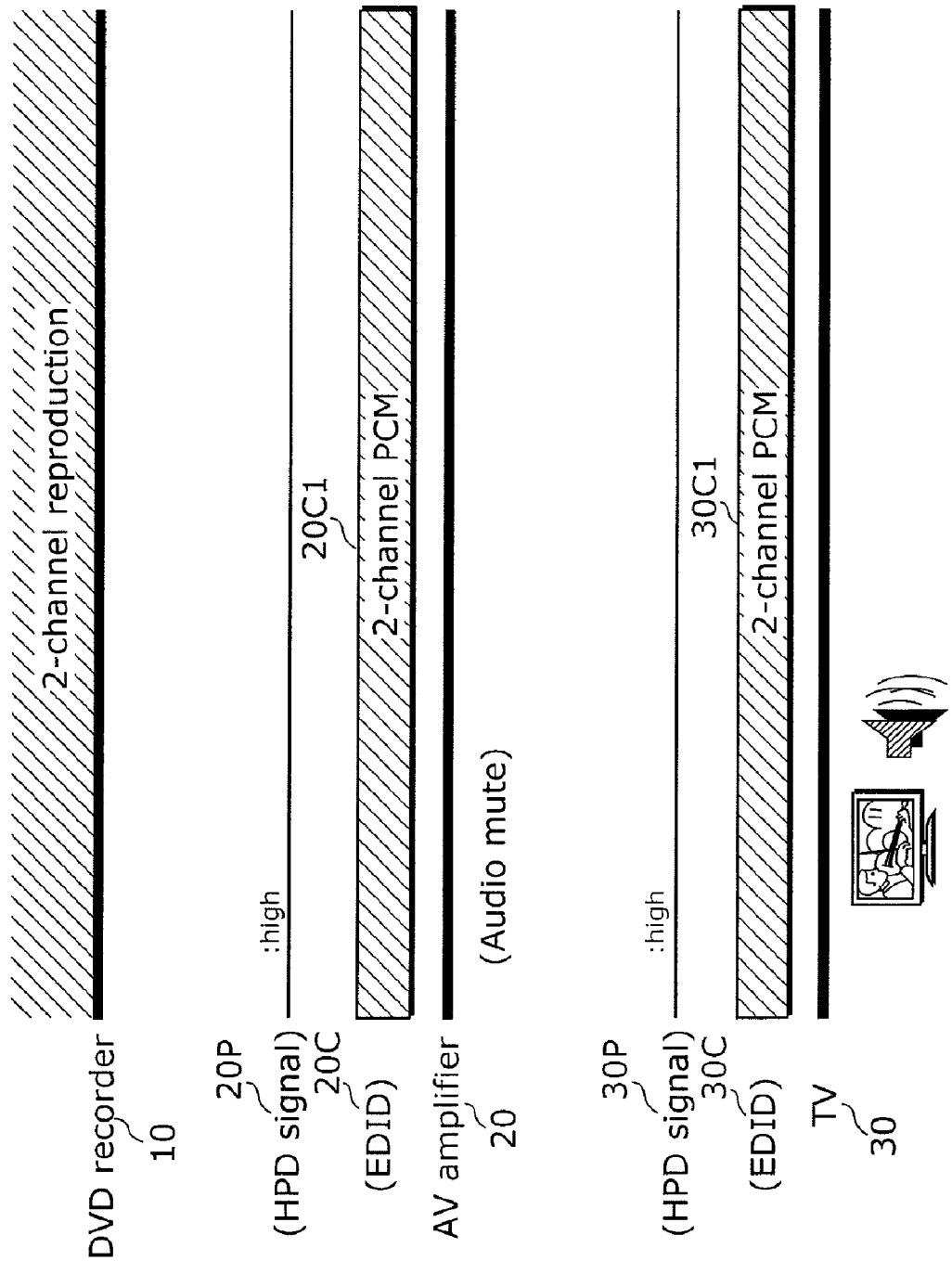
FIG. 2 shows an example of audio output in television mode.
Figure 3:
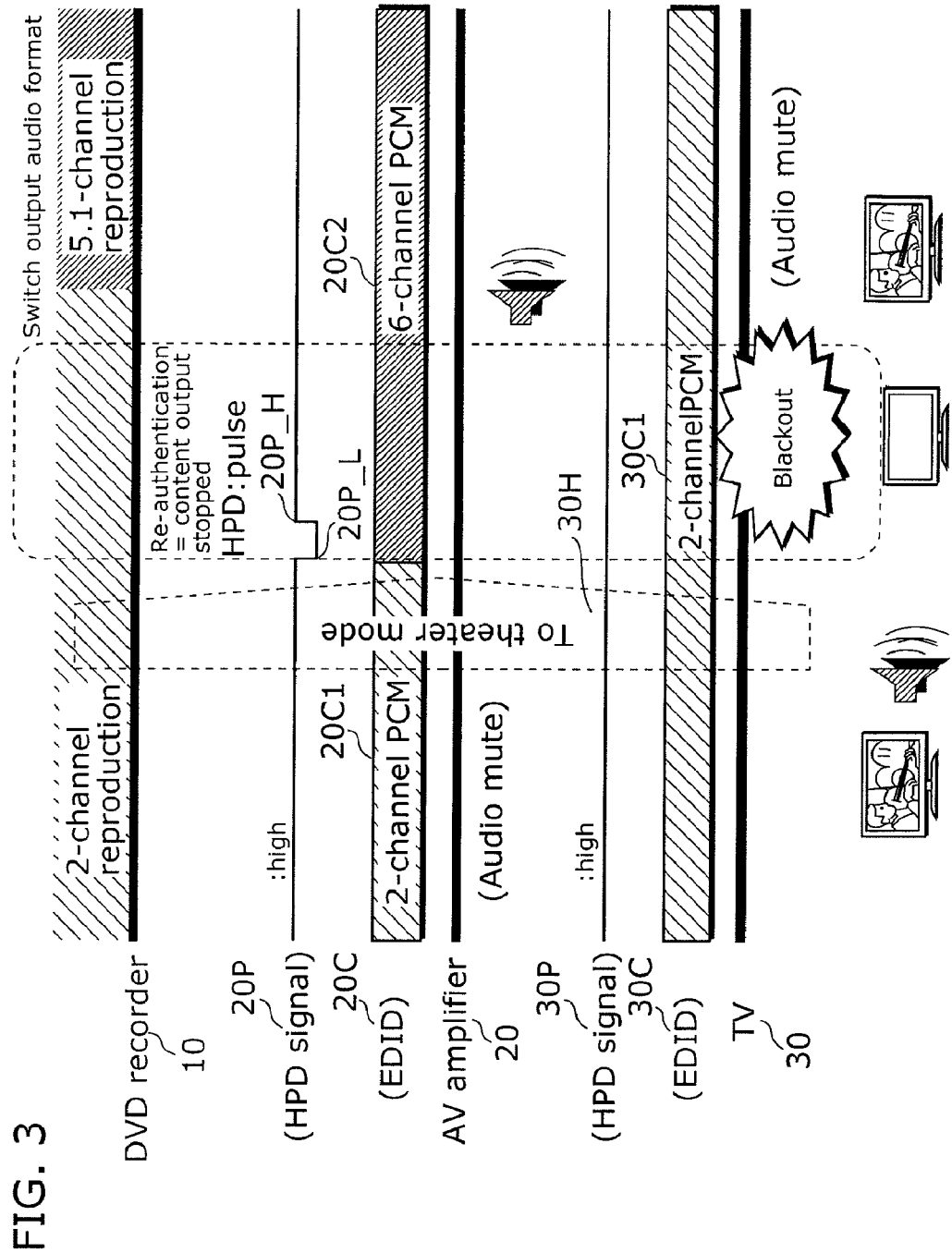
FIG. 3 shows a conventional example of an audio-video data reproduction method with the HDMI connection.

The configuration of the HDMI connection is identical to the configuration shown in FIG. 1. The DVD recorder 10, the AV amplifier 20, the TV 30, the EDIDs 20C and 30C, and the HPD signals 20P and 30P are identical to those shown in FIGS. 2 and 3. Furthermore, in the theater mode where the TV 30 outputs the video and the AV amplifier 20 outputs the audio, the audio reproduction capability information 30C1 of the TV 30, and the audio reproduction capability information 20C2 of the AV amplifier 20 are identical to those shown in FIG. 3.

Figure 8:
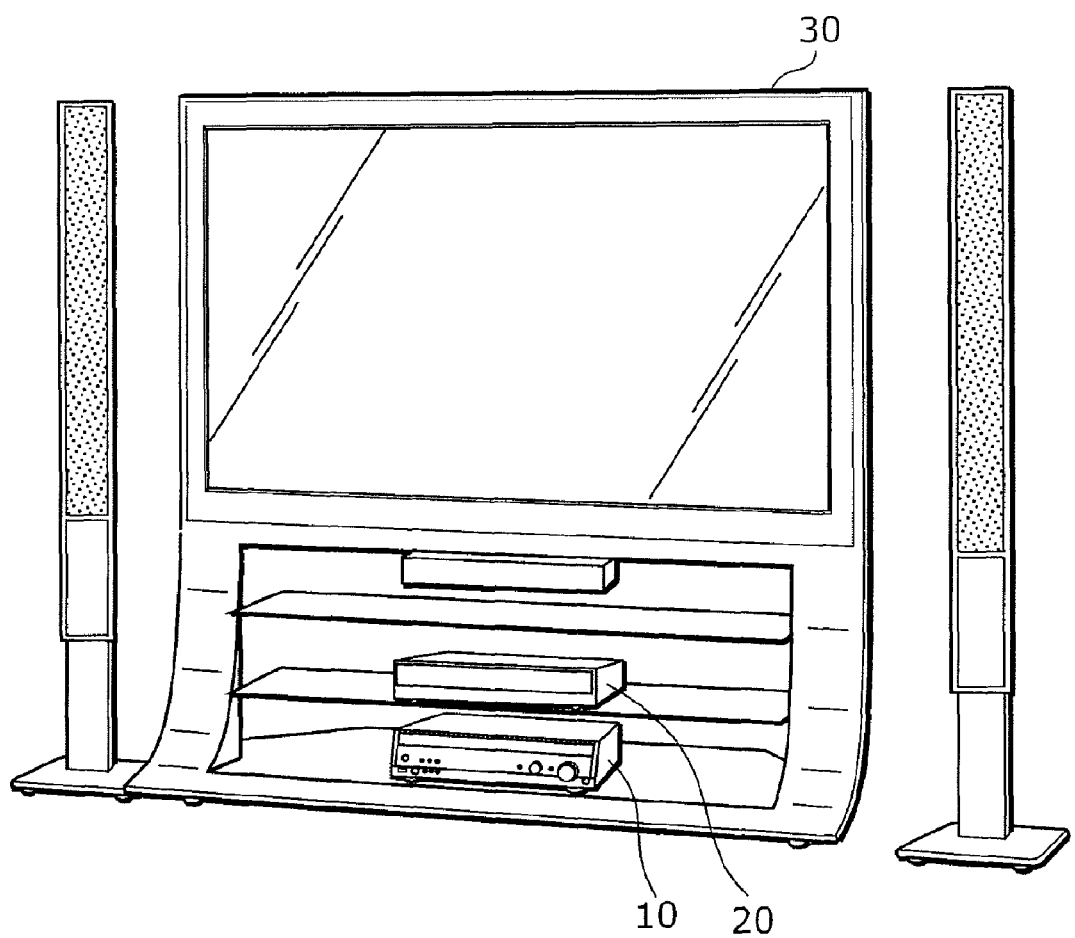
FIG. 8 is an external view of an audio-video data reproduction system.

FIG. 8 is an external view of an audio-video data reproduction system having the HDMI connection configuration shown in FIG. 1. The audio-video data reproduction system includes the DVD recorder 10, the AV amplifier 20, and the TV 30.

Here, when switching into the television mode where the TV 30 outputs the audio (30V), it is necessary for the DVD recorder 10 to switch the audio output to 2-channel PCM so that the TV 30 can properly reproduce the audio.

In the audio-video data reproduction method according to the present invention, the TV 30 first instructs the AV amplifier 20 the setting for the switching of audio reproduction capability (30M1). The instruction is transmitted using <Vendor Command> of the CEC message, for example, and specifies whether the setting of EDID of the AV amplifier 20 is changed or not, when switching between the television mode (the TV 30 outputs the audio and 2-channel PCM output is available) and the theater mode (the AV amplifier 20 outputs the audio, and audio output in accordance with the reproduction capability of the AV amplifier 20 is available). Here, a "switching mode" refers to the case where the reproduction capability of the EDID is changed, and a "fixed mode" refers to the case where the reproduction capability of the EDID is not changed. In the first embodiment, the fixed mode is specified.

When the AV amplifier 20 receives the setting instruction for the switching of the audio reproduction capability information (30M1), the AV amplifier 20 notifies the TV 30 of the setting for the audio reproduction capability switching (20M2). The notification is transmitted, for example, using the <Vendor Command> of the CEC message in which the effective state of the setting of switching mode (either the fixed mode or the switching mode) on the AV amplifier 20 and the audio reproduction capability of the AV amplifier 20 is described. The audio reproduction capability includes, for example, the type of supported audio (PCM, Digital Theater Systems (DTS) and others), the maximum number of the channels, a sampling frequency, a quantization bit rate and others. In the first embodiment, it is assumed that the AV amplifier 20 accepts the instruction from the TV 30, and the fixed mode is set. The AV amplifier 20 notifies the TV 30 of information, for example, "the fixed mode is set, and the audio reproduction capability is, for example, audio type=PCM, and the maximum number of channels=6".

Here, the TV 30 instructs the AV amplifier 20 to switch to the television mode (30V), and the AV amplifier mutes the audio output. Detailed explanation for the switching from the theater mode to the television mode and the operations thereof are omitted, since they are not the focus of the present invention.

When the switching from the theater mode to the television mode is performed, the AV amplifier 20 is set to the mode where the reproduction capability 20C of the EDID is not changed (fixed mode). Thus, it is not necessary for the AV amplifier 20 to send a pulse on the HPD signal 20P. Therefore, the DVD recorder 10 does not need to start the HDCP authentication with the AV amplifier 20 in order to confirm whether the AV amplifier is valid or not, and the DVD recorder 10 can continue outputting the contents.

The TV 30 sends instruction to the DVD recorder 10 for the output audio format (30M3). The instruction is transmitted using the <Vendor Command> of the CEC message, for example, and includes a mode specification whether the reproduction capability of the AV amplifier 20 is used or not, and the audio reproduction capability of the AV amplifier 20. The audio reproduction capability of the AV amplifier 20 described thereon including the same configuration and contents as the audio reproduction capability notified of the TV 30 by the AV amplifier 20 in the setting of for the audio reproduction capability switching (20M2). The mode setting which indicates whether the reproduction capability of the AV amplifier 20 is used or not is set as follows; the theater mode refers to the case where the reproduction capability of the AV amplifier 20 is used, and the television mode refers to the case where the reproduction capability of the AV amplifier 20 is not used. In the first embodiment, the television mode is specified.

When the DVD recorder 10 receives the instruction for the output audio format (30M3) from the TV 30, the DVD recorder 10 notifies the TV 30 of setting of the output audio format (10M4). The notification is transmitted, for example, using the <Vendor Command> of the CEC message, and the effective state of the mode on the DVD recorder 10 (either the fixed mode or the switching mode) is described. In the first embodiment, it is assumed that the DVD recorder 10 accepts the instruction from the TV 30, and the television mode is set. The DVD recorder 10 notifies the TV 30 of the setting of the television mode, and the DVD recorder 10 outputs the 2-channel PCM audio that has been determined in advance as the audio format in the television mode.

Accordingly, the DVD recorder 10 can adjust to the most suitable output audio format, regardless of the description on the audio reproduction capability information on the EDID 20C of the AV amplifier 20.

The configuration of the devices for achieving the audio-video reproduction method according to the first embodiment of the present invention will be described with reference to the drawings.

Figure 9:
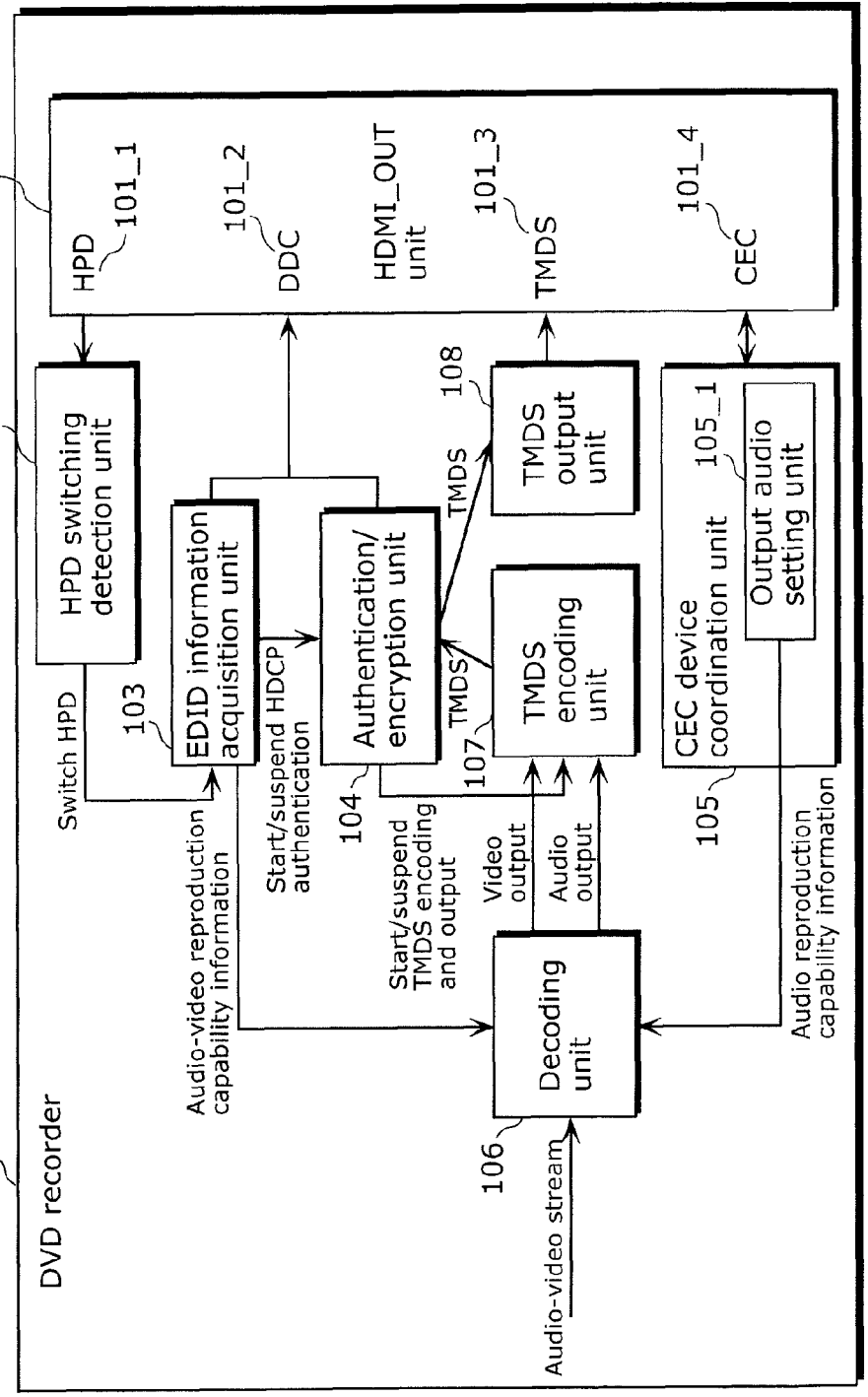
FIG. 9 shows the configuration of audio-video reproduction device according to the first embodiment of the present invention.

FIG. 9 shows the configuration of audio-video reproduction device according to the first embodiment of the present invention, and the DVD recorder 10 is the audio-video reproduction device.

The DVD recorder 10 includes the HDMI_OUT unit 101, the HPD switching detection unit 102, the EDID information acquisition unit 103, the authentication/encryption unit 104, the CEC device coordination unit 105, the decoding unit 106, the Transition-Minimized Differential Signaling (TMDS) encoding unit 107, and the TMDS output unit 108.

The HDMI_OUT unit 101 is an HDMI output port which is connected, in the first embodiment, to the AV amplifier 20 with HDMI, and performs transmission of the audio-video data and bidirectioinal communication of the control messages. The HDMI_OUT unit 101 is used for transmitting the HPD signal 101_1, the DDC signal 101_2, the TMDS signal 101_3 and the CEC signal 101_4. Here, the HDMI_OUT unit 101 may be provided with an interface capable of providing equivalent function according to the supported communication methods. The interface is not limited to the HDMI, and could be either wired or wireless, for example.

The HPD switching detection unit 102 detects switching of the HPD signal 101_1 inputted from the HDMI_OUT unit 101 from high to low and from low to high, and notifies the EDID information acquisition unit 103 of the switching.

When the EDID information acquisition unit 103 receives the switching detection notification of the HPD signal from low to high, the EDID information acquisition unit 103 reads the EDID of the AV amplifier 20 using the DDC signal 101_2. The EDID includes audio-video formats that can be supported and set by the AV amplifier 20. The EDID information acquisition unit 103 inputs the audio-video reproduction capability information to the decoding unit 106. Furthermore, in the EDID of the AV amplifier 20, it is also described that the AV amplifier 20 is an HDMI device. The EDID information acquisition unit 103 instructs the authentication/encryption unit 104 to apply the HDCP authentication to the HDMI device, and to start the authentication. Furthermore, when the EDID information acquisition unit 103 receives the switching detection notification of the HPD signal from high to low, the EDID information acquisition unit 103 instructs the authentication/encryption unit 104 to stop the HDCP authentication.

When the authentication/encryption unit 104 receives, from the EDID information acquisition unit 103, the instruction to start the authentication, the authentication/encryption unit 104 performs the HDCP authentication protocol using the DDC signal 101_2 with the AV amplifier 20, in order to confirm that the AV amplifier 20 is a device that is officially compliant with the HDCP. The authentication/encryption unit 104 outputs the data including contents that does not require the copyright protection and that is encoded in TMDS to the TMDS output unit 108, since TMDS output is required upon authentication. Here, the contents data that does not require copyright protection includes blackout images. When the authentication is successful, the authentication/encryption unit 104 instructs the TMDS encoding unit 107 to encode the contents to be output for TMDS transmission data and to output the data to the authentication/encryption unit 104. Meanwhile, the authentication/encryption unit 104 encrypts the TMDS transmission data using the successful authentication information, and outputs the TMDS transmission data to the TMDS output unit 108. When the authentication is not successful, the contents that require copyright protection cannot be outputted. Accordingly, the authentication/encryption unit 104 instructs the TMDS encoding unit 107 to stop TMDS encoding on the contents and the output to the authentication/encryption unit 104.

The CEC device coordination unit 105 transmits and receives the CEC message using the CEC signal 101_4. Here, the detailed description for the CEC communication and the CEC messages are omitted, since they are not the focus of the present invention. The CEC device coordination unit 105 includes the output audio setting unit 105_1. The output audio setting unit 105_1 receives the CEC message for instructing the output audio format (30M3), and transmits the CEC message for notifying the output audio format setting (10M4). Here, when the CEC message which specifies the output audio format (30M3) sets the theater mode, the output audio setting unit 105_1 outputs the audio reproduction capability of the AV amplifier 20 described in the CEC message (30M3) to the decoding unit 106 as the audio reproduction capability information. On the other hand, when the CEC message (30M3) sets the television mode, the output audio setting unit 105_1 outputs, to the decoding unit 106, the 2-channel audio reproduction capability that has been determined at the output audio setting unit 105_1 in advance as the audio reproduction capability information.

Regarding the video, the decoding unit 106 decodes the video stream based on the video reproduction capability information input from the EDID information acquisition unit 103. Regarding the audio, the decoding unit 106 decodes the audio stream based on the newest reproduction capability information out of the audio reproduction capability information input from the EDID information acquisition unit 103 or the output audio setting unit 105_1. The decoding unit 106 outputs the decoded audio-video data to the TMDS encoding unit 107.

The TMDS encoding unit 107 encodes the audio-video output data input from the decoding unit 106 for TMDS transmission data upon the instruction from the authentication/encryption unit 104, and outputs the encoded data to the authentication/encryption unit 104.

The TMDS output unit 108 outputs the encrypted TMDS transmission data input from the authentication/encryption unit 104 or unencrypted TMDS transmission data, using the TMDS 101_3 line in the HDMI_OUT unit 101.

Figure 10:
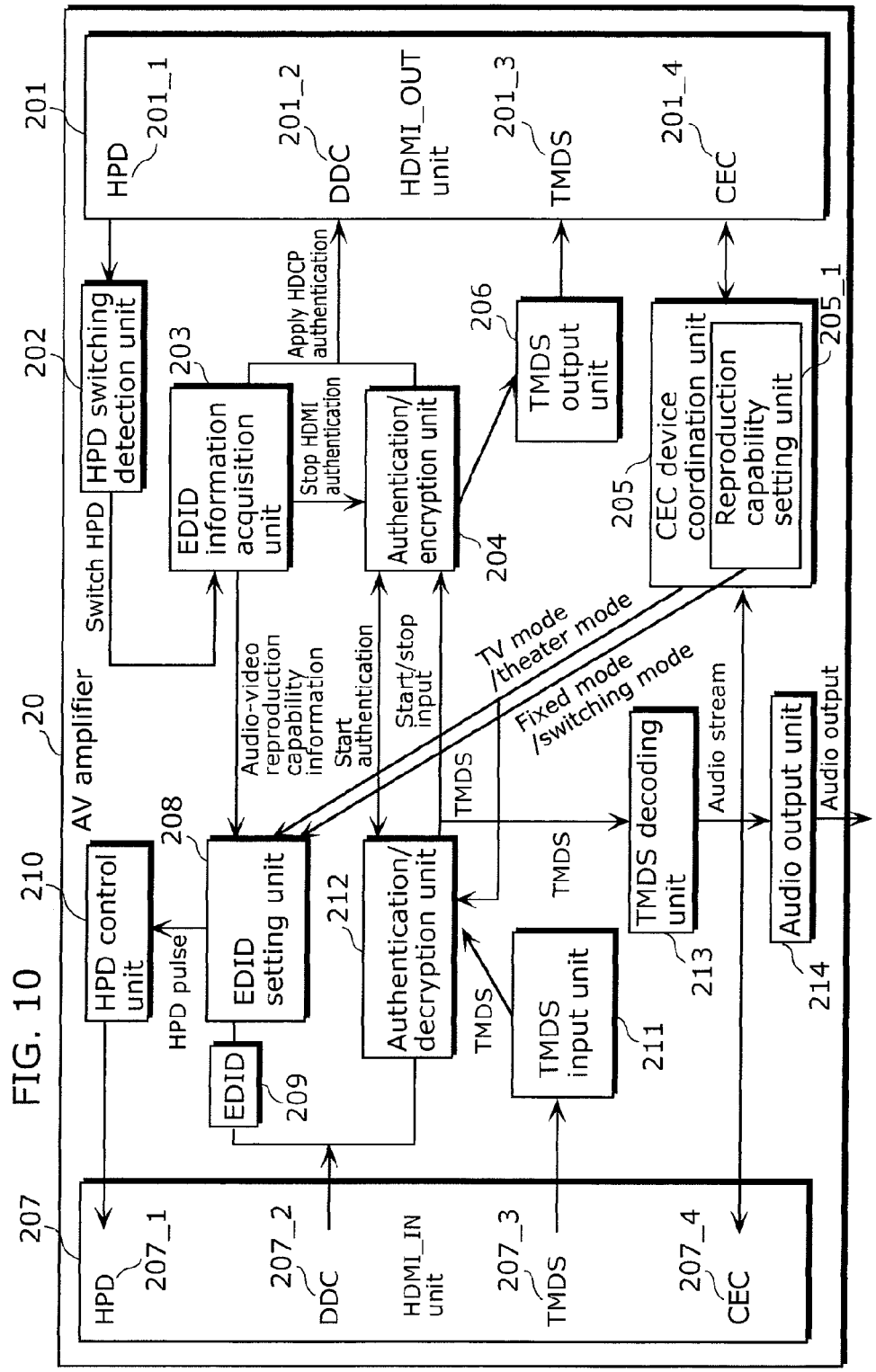
FIG. 10 shows the configuration of audio output device according to the first embodiment of the present invention.

FIG. 10 shows the configuration of the audio output device according to the first embodiment of the present invention, and the AV amplifier 20 is the audio output device.

The AV amplifier 20 includes the HDMI_OUT unit 201, the HPD switching detection unit 202, the EDID information acquisition unit 203, the authentication/encryption unit 204, the CEC device coordination unit 205, the TMDS output unit 206, the HDMI_IN unit 207, the EDID setting unit 208, the EDID 209, the HPD control unit 210, the HPD control unit 210, the TMDS input unit 211, the authentication/decryption unit 212, the TMDS decoding unit 213, and the audio output unit 214.

The HDMI_OUT unit 201 is an HDMI output port which is connected to the TV 30 with HDMI in the first embodiment, and performs transmission of the audio-video data and bidirectioinal communication of the control messages. The HDMI_OUT unit 201 is used for transmitting the HPD signal 201_1, the DDC signal 201_2, the TMDS signal 201_3 and the CEC signal 201_4. Here, the HDMI_OUT unit 201 may be provided with an interface capable of providing equivalent function according to the supported communication methods. The interface is not limited to the HDMI, and can be either wired or wireless, for example.

The HPD switching detection unit 202 detects switching of the HPD signal 201_1 inputted from the HDMI_OUT unit 201 from high to low and from low to high, and notifies the EDID information acquisition unit 203 of the switching.

When the EDID information acquisition unit 203 receives the switching detection notification of the HPD signal from low to high, the EDID information acquisition unit 203 reads the EDID of the TV 30 using the DDC signal 201_2. The EDID includes audio-video formats that can be supported and set by the TV 30. The EDID information acquisition unit 203 inputs the audio-video reproduction capability information to the EDID setting unit 208. Furthermore, in the EDID of the TV 30, it is also described that the TV 30 is an HDMI device. The EDID information acquisition unit 203 instructs the authentication/encryption unit 204 to apply the HDCP authentication to the HDMI device. Here, the EDID information acquisition unit 203 only instructs the authentication/encryption unit 204 to apply the HDCP authentication to the HDMI device, and does not instruct the authentication/encryption unit 204 to start the authentication. Furthermore, when the EDID information acquisition unit 203 receives the switching detection notification of the HPD signal from high to low, the EDID information acquisition unit 203 instructs the authentication/encryption unit 204 to stop the HDCP authentication.

When the authentication/encryption unit 204 receives, from the authentication/decryption unit 212, the instruction to start the authentication, the authentication/encryption unit 204 performs the HDCP authentication protocol using the DDC signal 201_2 with the TV 30, in order to confirm that the TV 30 is a device that is officially compliant with the HDCP. The authentication/encryption unit 204 outputs the data including contents that does not require the copyright protection and that is encoded in TMDS to the TMDS output unit 206, since TMDS output is required upon authentication. Here, the contents data that does not require copyright protection includes blackout images. When the authentication is successful, the authentication/encryption unit 204 instructs the authentication/decryption unit 212 to output the data. Meanwhile, the authentication/encryption unit 204 encrypts the input TMDS transmission data using the successful authentication information, and outputs the TMDS transmission data to the TMDS output unit 206. When the authentication is not successful, the contents that require copyright protection cannot be outputted. Accordingly, the authentication/encryption unit 204 instructs the authentication/decryption unit 212 to stop the output of the TMDS transmission data.

The CEC device coordination unit 205 transmits and receives the CEC message using the CEC signal 201_4 and 207_4. Here, the detailed description for the CEC communication and the CEC messages are omitted, since they are not the focus of the present invention. The CEC device coordination unit 205 recognizes the switching in the setting between the television mode and the theater mode, and notifies the setting information to the EDID setting unit 208 and the authentication/decryption unit 212. The CEC device coordination unit 205 includes the reproduction capability setting unit 205_1. The reproduction capability setting unit 205_1 receives the CEC message for instructing the setting for the switching of audio reproduction capability (30M1), and transmits the CEC message for notifying the TV 30 of the setting for audio reproduction capability switching (20M2). The reproduction capability setting unit 205_1 inputs the switching mode/fixed mode information in the CEC message specifying the audio reproduction capability switching settings to the EDID setting unit 208 (30M1).

The TMDS output unit 206 outputs the encrypted TMDS transmission data or unencrypted TMDS transmission data input from the authentication/encryption unit 204, using the TMDS 201_3 line in the HDMI_OUT unit 201.

The HDMI_IN unit 207 is an HDMI input port which is connected to the DVD recorder 10 with HDMI in the first embodiment, and performs reception of the audio-video data and bidirectioinal communication of the control messages. The HDMI_IN unit 207 is used for transmitting the HPD signal 207_1, the DDC signal 207_2, the TMDS signal 207_3 and the CEC signal 207_4. Here, the HDMI_OUT unit 207 may be provided with an interface capable of providing equivalent function according to the supported communication methods. The interface is not limited to the HDMI, and can be either wired or wireless, for example.

When the audio-video reproduction capability information is input from the EDID information acquisition unit 203 to the EDID setting unit 208, the EDID setting unit 208 determines the content of the EDID 209 based on the setting information of the television mode/the theater mode input from the CEC device coordination unit 205, and changes the content as necessary. For example, when the EDID information acquisition unit 203 inputs the audio-video reproduction capability information to the EDID setting unit 208, the audio reproduction capability information of the EDID 209 is set as, in the television mode, the 2-channel PCM, which is the audio reproduction capability of the TV 30, and is set as, in the theater mode, the 6-channel PCM, which is the audio reproduction capability of the device. Similarly, when the reproduction capability setting unit 205_1 specifies the switching mode, the EDID setting unit 208 determines, upon the input of the setting information between the television mode/the theater mode from the CEC device coordination unit 205, the content of the EDID 209 based on the input setting information between the television mode/the theater mode, and changes the content as necessary. Here, when the reproduction capability setting unit 205_1 specifies the fixed mode, the EDID setting unit 208 does not change the content of the EDID 209 even when the setting information of the television mode/theater mode is input from the CEC device coordination unit 205. The EDID setting unit 208 sends HPD pulse instruction to the HPD control unit 210 when the audio-video reproduction capability information is input from the EDID information acquisition unit 203, and when the content of the EDID 209 is changed.

The audio-video reproduction capability information is set in the EDID 209, based on the input by the EDID setting unit 208.

The HPD control unit 210 lowers the HPD signal 207_1 to low for 100 ms or more upon the HPD pulse instruction from the EDID setting unit 208, and raises the HPD signal 207_1 to high again.

The TMDS input unit 211 inputs the TMDS data using the TMDS signal 207_3 in the HDMI_IN unit 207, and outputs the TMDS data to the authentication/decryption unit 212.

The authentication/decryption unit 212 responds to the authentication protocol with which the DVD recorder 10 starts the authentication using the DDC signal 207_2, in order to confirm that the AV amplifier 20 is a device that is officially compliant with the HDCP. When the authentication starts, the authentication/decryption unit 212 instructs the authentication/encryption unit 204 to start the HDCP authentication with the TV 30. TMDS input is necessary for responding the authentication, the authentication/decryption unit 212 inputs unencrypted TMDS transmission data which does not require the copyright protection from the TMDS input unit 211. Furthermore, when the authentication is successful, the TMDS input unit 211 inputs the TMDS transmission data encrypted using the successful authentication information. The authentication/decryption unit 212 outputs the unencrypted TMDS transmission data by decrypting the encrypted TMDS transmission data. Here, the authentication/decryption unit 212 outputs the decrypted TMDS transmission data, based on the setting information of the television mode/the theater mode. The decrypted TMDS transmission data is output to TMDS decoding unit 213 in the theater mode, and is output to the authentication/encryption unit 204 upon instruction to input the decrypted TMDS transmission data.

The TMDS decoding unit 213 decodes the TMDS transmission data, and outputs the audio stream to the audio output unit 214.

The audio output unit 214 is a speaker unit and outputs the audio.

Figure 11:
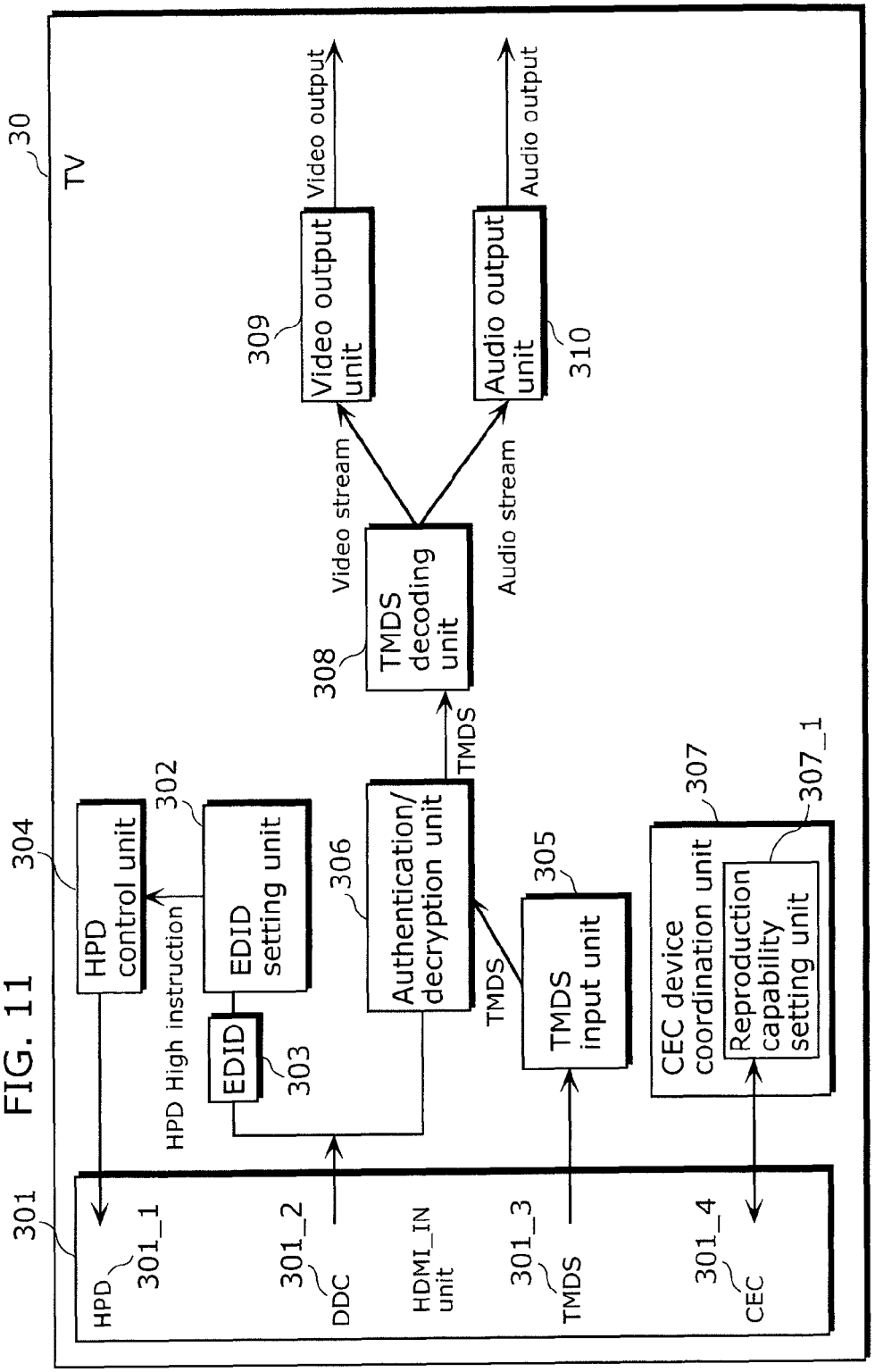
FIG. 11 shows the configuration of audio-video output device according to the first embodiment of the present invention.

FIG. 11 shows the configuration of audio-video output device according to the first embodiment of the present invention, and the TV 30 is the audio-video output device.

The TV 30 includes the HDMI_IN unit 301, the EDID setting unit 302, the EDID 303, the HPD control unit 304, the TMDS input unit 305, the authentication/decryption unit 306, the CEC device coordination unit 307, the TMDS decoding unit 308, the video output unit 309, and the audio output unit 310.

The HDMI_IN unit 301 is an HDMI input port which is connected to the AV amplifier 20 with HDMI in the first embodiment, and performs reception of the audio-video data and bidirectioinal communication of the control messages. The HDMI_IN unit 301 is used for transmitting the HPD signal 301_1, the DDC signal 301_2, the TMDS signal 301_3 and the CEC signal 301_4. Here, the HDMI_OUT unit 301 may be provided with an interface capable of providing equivalent function according to the supported communication methods. The interface is not limited to the HDMI, and can be either wired or wireless, for example.

The EDID setting unit 302 determines the content of the EDID 303 and sets the content when, for example, switching on the power. For example, it is set that the audio reproduction capability is 2-channel PCM. When the content of the EDID is set, the EDID setting unit 302 instructs the HPD control unit 304 to raise the HPD to high.

The audio-video reproduction capability information is set in the EDID 303, based on the input by the EDID setting unit 302.

The HPD control unit 304 raises the HPD signal 301_1 to high when receiving the instruction to raise the HPD signal to high from the EDID setting unit 302.

The TMDS input unit 305 inputs the TMDS data using the TMDS 301_3 signal line in the HDMI_IN unit 301, and outputs the TMDS data to the authentication/decryption unit 306.

The authentication/decryption unit 306 responds to the authentication protocol with which the AV amplifier 20 starts the authentication using the DDC signal 301_2, in order to confirm that the TV 30 is a device that is officially compliant with the HDCP. TMDS input is necessary for responding the authentication, the authentication/decryption unit 306 inputs unencrypted TMDS transmission data which does not require the copyright protection from the TMDS input unit 305. Furthermore, when the authentication is successful, the TMDS input unit 305 inputs the TMDS transmission data encrypted using the successful authentication information. The authentication/decryption unit 306 decrypts the encrypted TMDS transmission data, and outputs the unencrypted TMDS transmission data to the TMDS decoding unit 308.

The CEC device coordination unit 307 transmits and receives the CEC message using the CEC signal 301_4. Here, the detailed description for the CEC communication and the CEC messages are omitted, since they are not the focus of the present invention. The CEC device coordination unit 307 switches setting between the television mode and the theater mode through the CEC communication with the DVD recorder 10 and the AV amplifier 20. The CEC device coordination unit 307 includes the reproduction capability setting unit 307_1. The reproduction capability setting unit 307_1 transmits the CEC message for instructing the setting for audio reproduction capability switching (30M1), and receives the CEC message for notifying the TV 30 of the setting for the audio reproduction capability switching (20M2). Furthermore, the reproduction capability setting unit 307_1 transmits the CEC message specifying the output audio format (30M3) to the DVD recorder 10, and receives the message from the DVD recorder 10, notifying the TV 30 of the output audio format setting.

The TMDS decoding unit 308 decodes the TMDS transmission data, and outputs the video stream to the video output unit 309, and outputs the audio stream to the audio output unit 310.

The video output unit 309 is a display unit, and outputs the video.

The audio output unit 310 is a speaker unit and outputs the audio.

With the operations described above, in the audio-video reproduction method according to the present invention, the audio-video reproduction device can adjust, at any timing, the output audio to the most suitable output audio format without stopping contents transmission by specifying the audio format that the audio reproduction device can reproduce using the command notification by the control message.

Furthermore, specifying that the audio output device does not switch the reproduction capability information using the command notification by the control message, it is not necessary for the audio output device to cause the audio-video reproduction device to read the audio reproduction capability information. Accordingly, the content transmission is not stopped, and thus, it is possible to switch the transmission of the audio data to the most suitable audio data without interruption in video.

Second Embodiment

In the audio-video data reproduction method according to the second embodiment of the present invention, instructions and notifications using control messages specify the audio format that the audio-video reproduction device is capable of outputting, in the same manner as described in the first embodiment. The audio-video output device does not switch the data reproduction capability information read by the audio-video reproduction device even when audio reproduction capability changes due to a change in the audio output device among the HDMI output devices connected to the audio-video reproduction device. Accordingly, it is not necessary for the audio-video output device to switch an HPD signal to the audio-video reproduction device from low to high (send a pulse), and there is no need for the audio-video reproduction device to perform an HDCP authentication again. Thus, the audio-video output device can let the audio-video reproduction device to switch the transmission to the transmission of appropriate audio data without an interruption of the video.

Figure 4:
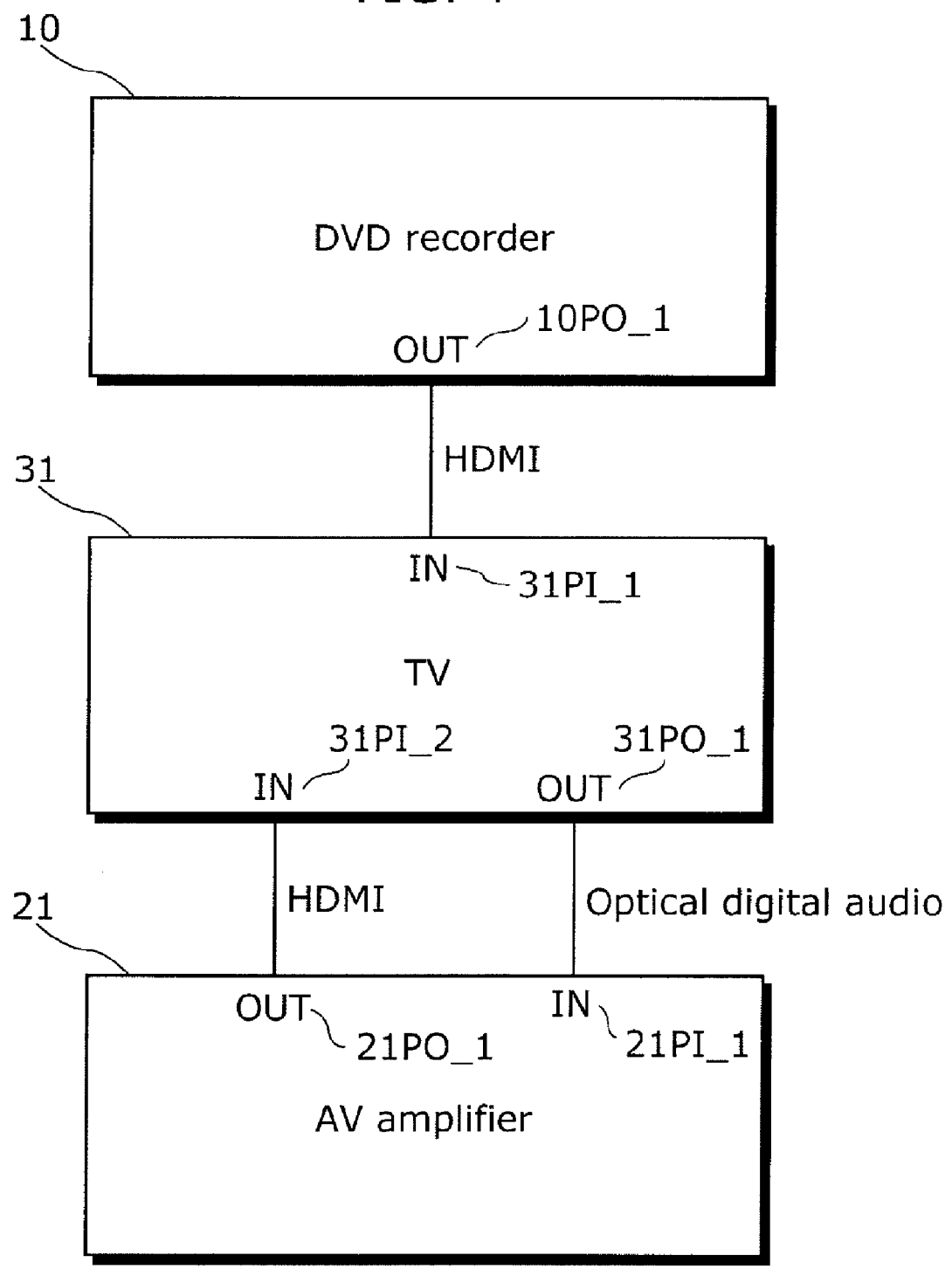
FIG. 4 shows another example configuration of the HDMI connection.
Figure 5:
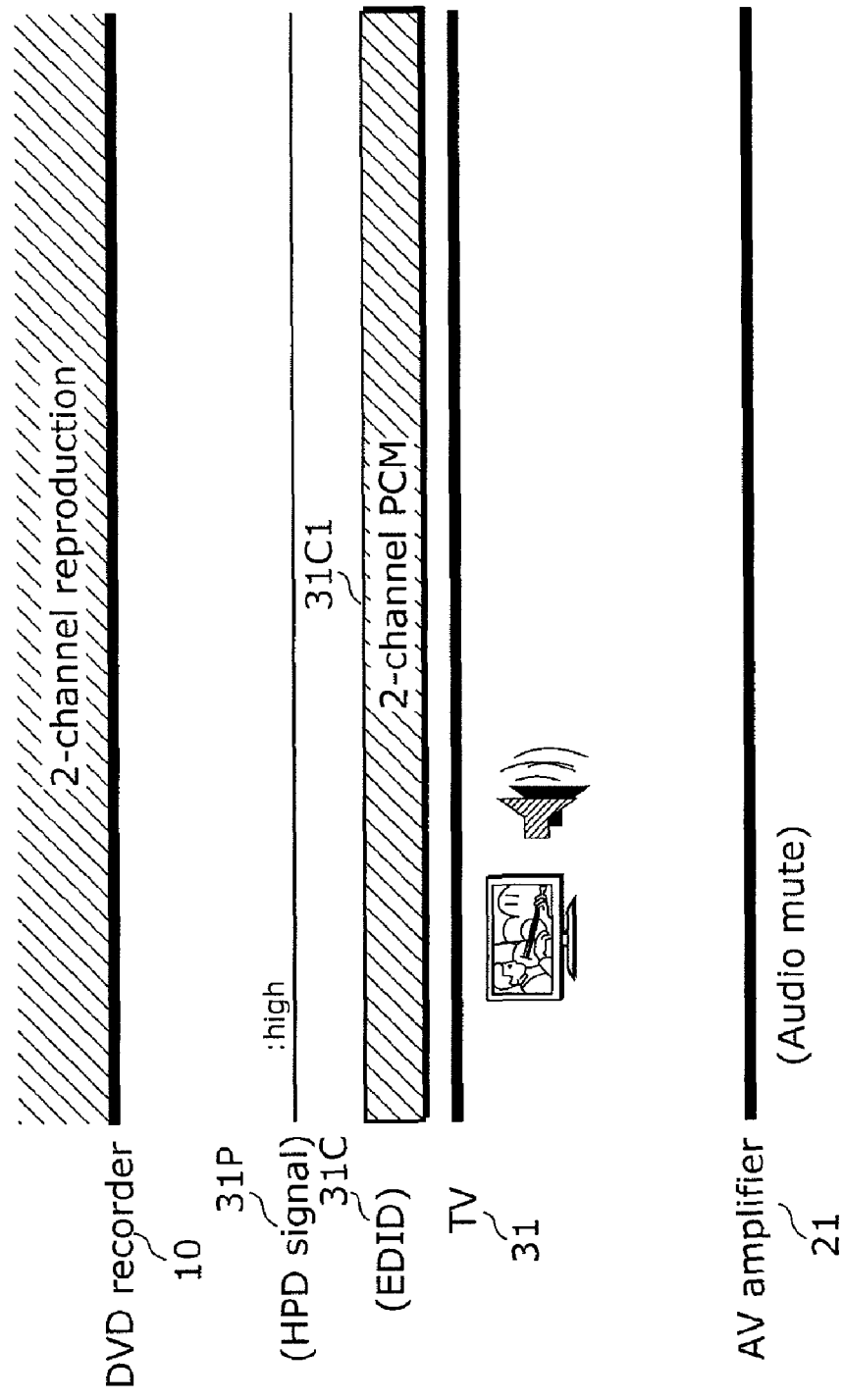
FIG. 5 shows another example of audio output in the television mode.
Figure 6:
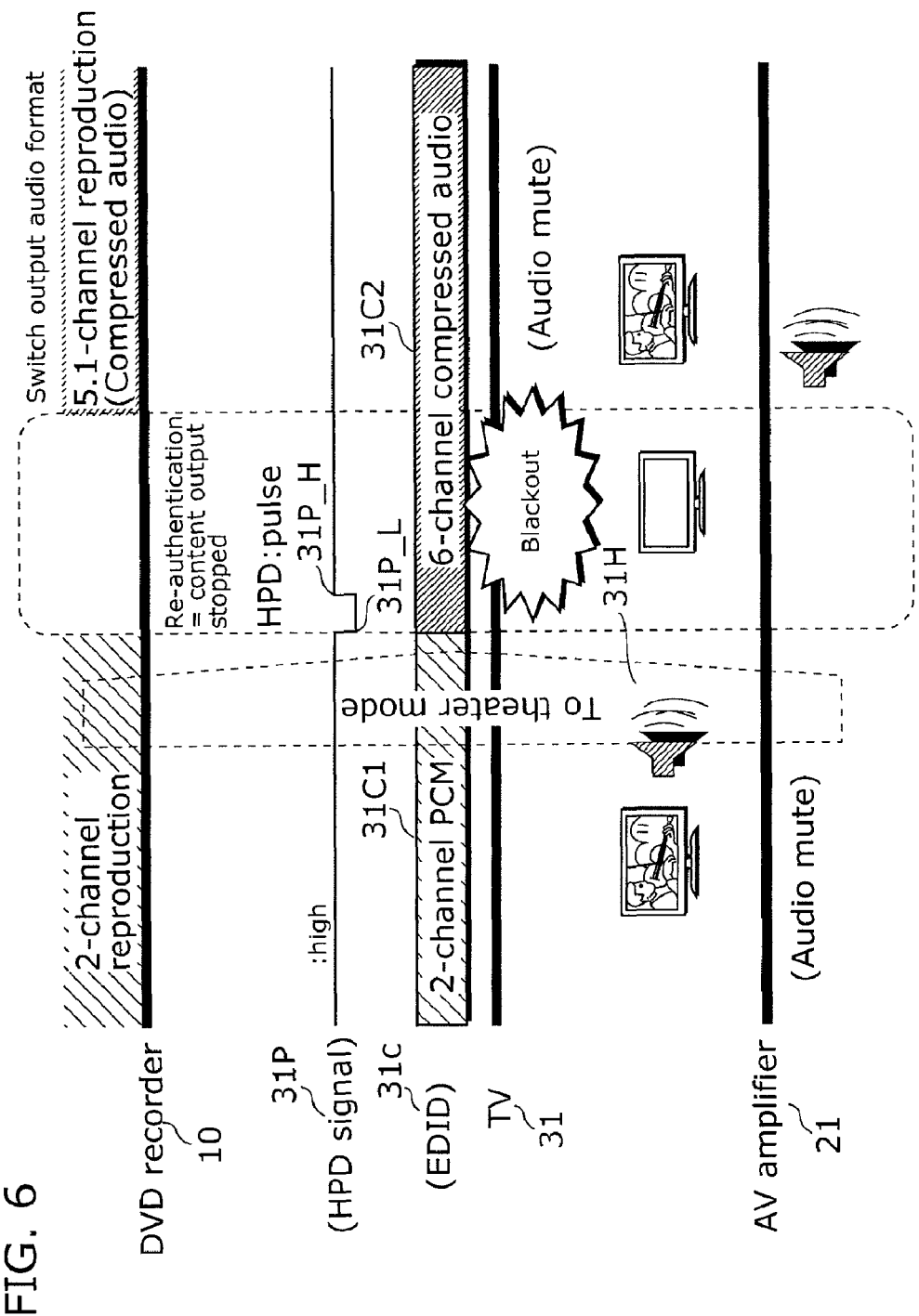
FIG. 6 shows another conventional example of the audio-video data reproduction method with the HDMI connection.
Figure 12:
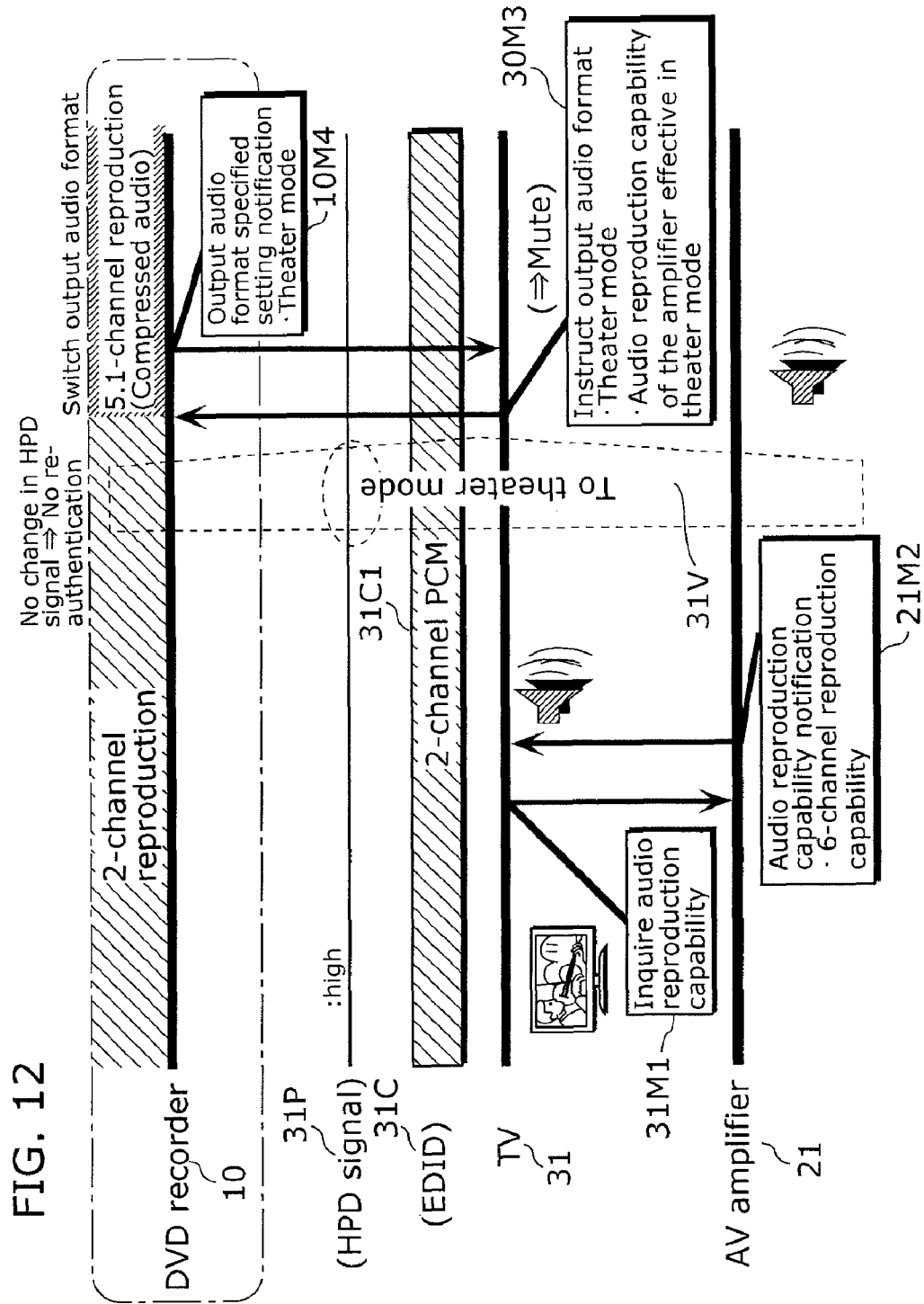
FIG. 12 shows an example of the audio-video data reproduction method in the HDMI connection according to the second embodiment of the present invention.

FIG. 12 shows an example of the audio-video data reproduction method in the HDMI connection according to the second embodiment of the present invention. The configuration of the HDMI connection is identical to the configuration shown in FIG. 4. The DVD recorder 10, the AV amplifier 21, the TV 31, the EDID 31C, and the HPD signal 31P are identical to those shown in FIGS. 5 and 6. Furthermore, in the theater mode where the TV 31 outputs the video and the AV amplifier 21 outputs the audio, the audio reproduction capability information 31C1 of the TV 31 is identical to the same shown in FIG. 5.

Here, when switching from the television mode where the TV 31 outputs the audio to the theater mode where the AV amplifier 21 outputs the audio (31V), it is necessary for the DVD recorder 10 to switch the audio output to 5.1-channel surround audio so that the AV amplifier 21 can properly reproduce the 5.1-channel surround audio.

In the audio-video data reproduction method according to the present invention, the TV 31 first requests acquisition of the audio reproduction capability of the AV amplifier 21 (31M1). This request is transmitted using the <Vendor Command> in the CEC message, for example.

When the AV amplifier 21 receives the request for acquiring the audio reproduction capability (31M1), the AV amplifier 21 notifies the TV 31 of the audio reproduction capability (21M2). The notification is transmitted, for example, using the <Vendor Command> of the CEC message and the audio reproduction capability of the AV amplifier 21 is described. The audio reproduction capability described thereon is identical to the same in the first embodiment, and in the second embodiment, the AV amplifier 21 notifies the TV 31 of the audio reproduction capability, for example, "audio type=Dolby Digital, and the maximum number of channels=6".

Here, the TV 31 instructs the AV amplifier 21 to switch to the theater mode (31V), and the AV amplifier 21 starts the audio output. Detailed explanation for the switching from the television mode to the theater mode and the operations thereof are omitted, since they are not the focus of the present invention.

Even when the switching from the television mode to the theater mode is performed, it is not necessary for the TV 31 to send a pulse on the HPD signal 31P. Therefore, the DVD recorder 10 does not need to start the HDCP authentication with the TV 31 in order to confirm whether the TV 31 is valid or not, and the DVD recorder 10 can continue outputting the contents.

The TV 31 sends instruction to the DVD recorder 10 for the output audio format (30M3). The instruction is transmitted using the <Vendor Command> of the CEC message, for example, and includes a mode instruction whether the reproduction capability of the AV amplifier 21 is used or not, and the audio reproduction capability of the AV amplifier 21. The audio reproduction capability of the AV amplifier 21 described thereon includes the same configuration and contents as the audio reproduction capability notified of the TV 31 by the AV amplifier 21 in the notification of the audio reproduction capability (21M2). The mode setting which indicates whether the reproduction capability of the AV amplifier 21 is used or not is set as follows, in the same manner as the first embodiment; the theater mode refers to the case where the reproduction capability of the AV amplifier 21 is used, and the television mode refers to the case where the reproduction capability of the AV amplifier 21 is not used.

When the DVD recorder 10 receives the instruction for the output audio format from the TV 31 (30M3), the DVD recorder 10 notifies the TV 31 of setting of the output audio format (10M4). The notification is transmitted, for example, using the <Vendor Command> of the CEC message, and the effective state of the mode on the DVD recorder 10 (either the fixed mode or the switching mode) is described. In the second embodiment, it is assumed that the DVD recorder 10 accepts the instruction from the TV 31, and the television mode is set. The DVD recorder 10 notifies the TV 31 of the setting to the television mode, and the DVD recorder 10 outputs the 2-channel PCM audio that has been determined in advance as the audio format in the television mode. Similarly, when the DVD recorder 10 accepts the instruction from the TV 31 and the theater mode is set, the DVD recorder 10 notifies the TV 31 of the setting to the theater mode. The DVD recorder 10 selects a suitable audio reproduction capability out of the instruction for the output audio format (30M3), and uses the format as the audio output format. For example, when the audio format included in the audio data recorded on the DVD being reproduced is 5.1-channel Dolby Digital, and when 5.1-channel Dolby Digital is included in the instruction for output audio format (30M3), 5.1-channel Dolby Digital is used as the output audio format.

Accordingly, the DVD recorder 10 can adjust to the most suitable output audio format, regardless of the description on the audio reproduction capability information 31C2 on the EDID 31C of the TV 31.

The configuration of the devices for achieving the audio-video reproduction method according to the second embodiment of the present invention will be described in detail with reference to the drawings.

Figure 13:
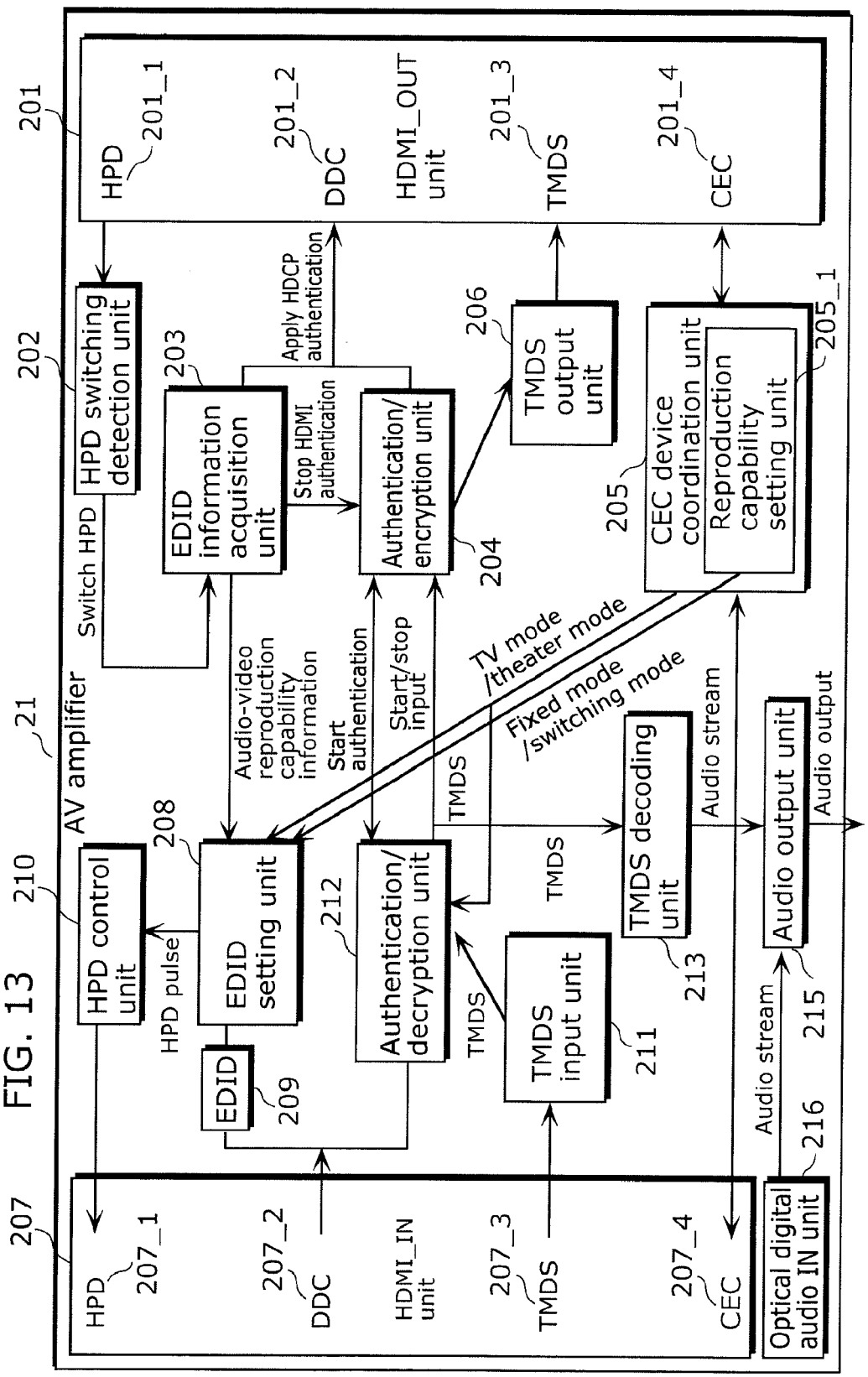
FIG. 13 shows the configuration of audio output device according to the second embodiment of the present invention.

FIG. 13 shows the configuration of the audio output device according to the second embodiment of the present invention, and the AV amplifier 21 is the audio output device. The processing units denoted by the same reference numeral in FIG. 10 perform the same operation as in the first embodiment.

The AV amplifier 21 includes, in addition to the configuration shown in FIG. 10, the optical digital audio IN unit 216, and includes the audio output unit 215 instead of the audio output unit 214.

The optical digital audio IN unit 216 is an optical digital audio input port, and is connected to the TV 31 with the optical digital audio cable, and receives the audio data from the TV 31.

The audio output unit 215 is a speaker unit, and outputs the received audio from the TMDS decoding unit 213 or the optical digital audio IN unit 216.

Figure 14:
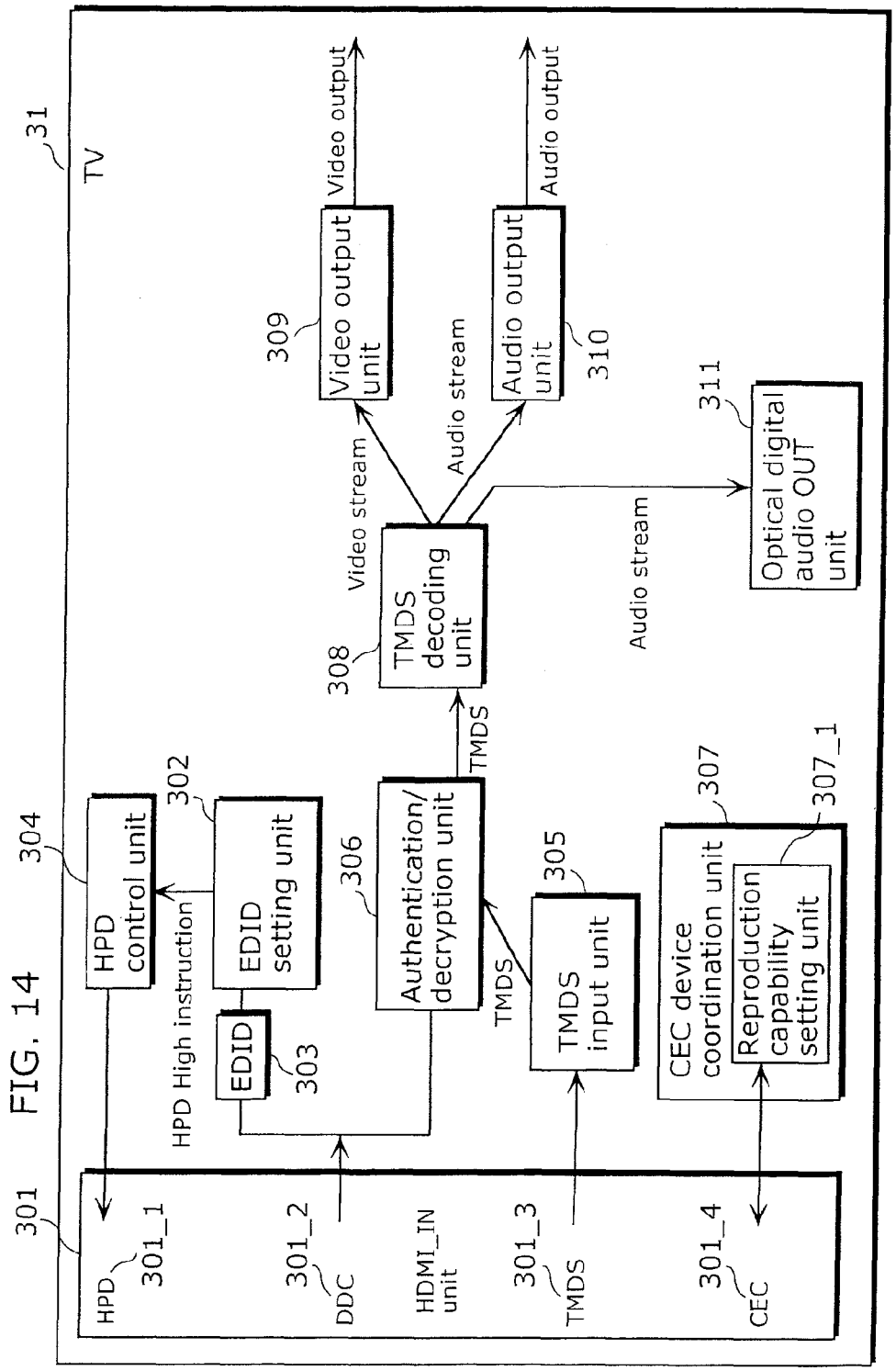
FIG. 14 shows the configuration of audio-video output device according to the second embodiment of the present invention.

FIG. 14 shows the configuration of audio-video output device according to the second embodiment of the present invention, and the TV 31 is the audio-video output device. The processing units denoted by the same reference numerals in FIG. 11 perform the same operation as in the first embodiment.

The TV 31 includes the optical digital audio OUT unit 311 in addition to the configuration of the TV 30 shown in FIG. 11.

The optical digital audio OUT unit 311 is an optical digital audio output port, and in the second embodiment, is connected to the AV amplifier 21 with the optical digital audio cable, and transmits the audio data output from the TMDS decoding unit 308.

With the operations described above, in the audio-video reproduction method according to the present invention, the audio-video reproduction device can adjust, at any timing, the output audio to the most suitable output audio format without stopping contents transmission by specifying the audio format that the audio reproduction device can output using the command notification by the control message.

Furthermore, since the audio-video output device does not switch the reproduction capability information, it is not necessary for the audio-video output device to cause the audio-video reproduction device to read the audio reproduction capability information. Accordingly, the content transmission is not stopped. Thus, the audio-video reproduction device can switch the transmission to suitable audio data without an interruption of the video.

Note that the TV 31 may transmit a predetermined audio reproduction capability instead of the audio reproduction capability of the AV amplifier 21, when sending the instruction for the output audio format (30M3). In this case, the TV 31 does not have to transmit the request for acquiring the audio reproduction capability information (31M1) to the AV amplifier 21. Alternatively, the TV 31 may also transmit a predetermined audio reproduction capability when the TV 31 could not acquire the audio reproduction capability of the AV amplifier 21. In either case, it is necessary for the TV 31 to have a part of, or all of the audio reproduction capability of the AV amplifier 21.

Note that, in the first embodiment, switching from the theater mode to the television mode is described; however, the switching from the television mode to the theater mode may also be performed in the same manner. Furthermore, in the second embodiment, switching from the television mode to the theater mode is described; however, the switching from the theater mode to the television mode may also be performed in the same manner.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to an audio-video data reproduction method from an audio-video reproduction device such as a DVD recorder, and is applicable particularly to an audio-video data reproduction method in a device connected to a network such as a home entertainment network where devices are connected by unidirectional data connection, and where messages are bidirectionally received and transmitted between the communication devices.

The invention claimed is:

1. An audio-video output device connected, via a network, to an audio-video reproduction device which reproduces audio data and video data, and to an audio output device capable of outputting the audio data reproduced by the audio-video reproduction device, said audio-video output device being capable of outputting the audio data and the video data reproduced by the audio-video reproduction device,
wherein, in the network:
(i) the audio data and the video data are unidirectionally transmitted from any given data transmission device to any given data reception device;
(ii) a control message is bidirectionally transmitted between all of the devices; and
(iii) a connection between the devices for transmitting and receiving the audio data and the video data becomes valid when unidirectional transmission of audio reproduction capability information of the data reception device from the data reception device to the data transmission device becomes available,
said audio-video output device comprises:
an audio reproduction capability inquiry unit configured to inquire, from the audio output device, audio reproduction capability information of the audio output device, and to acquire the audio reproduction capability information; and
a control message transmission unit configured to transmit, to the audio-video reproduction device, the control message including the audio reproduction capability information of the audio output device and information setting whether audio reproduction capability indicated by the audio reproduction capability information is used or not,
in the case where, (i) in the network, the audio-video reproduction device and said audio-video output device are connected in such a manner that the audio data and the video data are unidirectionally transmitted from the audio-video reproduction device to said audio-video output device, and where (ii) said audio-video output device and the audio output device are connected in such a manner that the audio data is output from said audio-video output device to the audio output device through a network different from the network,
said control message transmission unit is configured to prohibit re-transmitting the audio reproduction capability information to the audio-video reproduction device using unidirectional transmission when transmitting the control message.

2. The audio-video output device according to claim 1,
wherein, in the network, when the audio-video reproduction device, the audio output device, and said audio-video output device are connected in such a manner that (i) the audio data and the video data are unidirectionally transmitted from the audio-video reproduction device to the audio output device and that (ii) the audio data and the video data are unidirectionally transmitted from the audio output device to said audio-video output device, and
said control message transmission unit is further configured to transmit the control message to said audio output device, said control message includes information setting of the audio output device whether the audio reproduction capability information by a unidirectional transmission to said audio-video reproduction device is switched or not.

3. An audio output device connected, via a network, to an audio-video reproduction device which reproduces audio data and video data, and to an audio-video output device capable of outputting the audio data and the video data reproduced by the audio-video reproduction device, said audio output device being capable of outputting the audio data reproduced by the audio-video reproduction device,
wherein, in the network:
(i) the audio data and the video data are unidirectionally transmitted from any given data transmission device to any given data reception device;
(ii) a control message is bidirectionally transmitted between all of the devices; and
(iii) a connection between the devices for transmitting and receiving the audio data and the video data becomes valid when unidirectional transmission of audio reproduction capability information of the data reception device from the data reception device to the data transmission device becomes available,
said audio output device comprises:
a control message transmission unit configured to include, to the control message, the audio reproduction capability information of said audio output device and information indicating whether the audio reproduction capability information by a unidirectional transmission is switched or not, and to transmit the information to the audio-video output device; and
a control message reception unit configured to receive, from the audio-video output device, the control message including the information setting whether the audio reproduction capability information by the unidirectional transmission is switched or not, and
when, in the network, the audio-video reproduction device, said audio output device, and the audio-video output device are connected in such a manner that (i) the audio data and the video data are unidirectionally transmitted from the audio-video reproduction device to the audio output device and that (ii) the audio data and the video data are unidirectionally transmitted from said audio output device to the audio-video output device, said control message reception unit is configured to prohibit re-transmitting the audio reproduction capability information to the audio-video reproduction device using unidirectional transmission, when said control message reception unit receives the control message transmitted from the audio-video output device and indicating that the audio reproduction capability information by the unidirectional transmission is not switched.

4. An audio-video reproduction device which reproduces audio data and video data, and which is connected, via a network, to an audio-video output device capable of outputting the audio data and the video data reproduced by said audio-video reproduction device, and to an audio output device capable of outputting the audio data reproduced by said audio-video reproduction device,
wherein, in the network:
(i) the audio data and the video data are unidirectionally transmitted from any given data transmission device to any given data reception device;
(ii) a control message is bidirectionally transmitted between all of the devices; and
(iii) a connection between the devices for transmitting and receiving the audio data and the video data becomes valid when unidirectional transmission of audio reproduction capability information of the data reception device from the data reception device to the data transmission device becomes available,
said audio-video reproduction device comprising:
a control message reception unit configured to receive the control message including audio reproduction capability information of the audio output device and information setting whether the audio reproduction capability information is used or not; and
a reproduction unit configured to reproduce the audio data and the video data, and
said reproduction unit reproduces the audio data in accordance with the audio reproduction capability information included in the control message received from the audio-video output device, when said control message reception unit receives the control message indicating that the audio reproduction capability information is used, instead of the audio reproduction capability information received from the audio output device through the unidirectional transmission.

5. An audio-video data reproduction system comprising:
an audio-video reproduction device which reproduces audio data and video data;
an audio output device which is capable of outputting the audio data reproduced by said audio-video reproduction device; and
an audio-video output device capable of outputting the audio data and the video data reproduced by said audio-video reproduction device,
wherein said audio-video reproduction device, said audio output device, and said audio-video output device are connected to one another via a network,
in the network:
(i) the audio data and the video data are unidirectionally transmitted from any given data transmission device to any given data reception device;
(ii) a control message is bidirectionally transmitted between all of the devices; and
(iii) a connection between the devices for transmitting and receiving the audio data and the video data becomes valid when unidirectional transmission of audio reproduction capability information of the data reception device from the data reception device to the data transmission device becomes available,
said audio-video output device includes:
an audio reproduction capability inquiry unit configured to inquire, from said audio output device, audio reproduction capability information of said audio output device and to acquire the audio reproduction capability information;
an audio-video output device side control message transmission unit configured to include, to the control message, the audio reproduction capability information of said audio output device and information setting whether audio reproduction capability indicated by the audio reproduction capability information is used or not, and to transmit the control message to said audio-video reproduction device, and
said audio-video output device side control message transmission unit is further configured to include, to the control message, information setting whether the audio reproduction capability information using unidirectional transmission is switched or not, and to transmit the control message to said audio output device,
said audio output device includes:
an audio output device side control message transmission unit configured to include, to the control message, the audio reproduction capability information of said audio output device and information indicating whether the audio reproduction capability information by the unidirectional transmission is switched or not, and to transmit the control message to said audio-video output device; and an audio output device side control message reception unit configured to receive the control message including the information setting whether the audio reproduction capability information by the unidirectional transmission is switched or not, and said audio-video reproduction device includes:

an audio-video reproduction device side control message reception unit configured to receive the control message including the audio reproduction capability information of said audio output device and the information setting whether the audio reproduction capability information is used or not; and a reproduction unit configured to reproduce the audio data and the video data, when, in the network, said audio-video reproduction device, said audio output device, and said audio-video output device are connected in such a manner that (i) the audio data and the video data are unidirectionally transmitted from said audio-video reproduction device to said audio output device, and that (ii) the audio data and the video data are unidirectionally transmitted from said audio output device to said audio-video output device, said audio output device prohibits re-transmitting the audio reproduction capability information to said audio-video reproduction device using the unidirectional transmission, when said audio output device side control message reception unit receives the control message transmitted by said audio-video output device side control message transmission unit, indicating that the audio reproduction capability information by the unidirectional transmission is not switched, in the case where, (i) in the network, said audio-video reproduction device and said audio-video output device are connected in such a manner that the audio data and the video data are unidirectionally transmitted from said audio-video reproduction device to said audio-video output device, and where (ii) said audio-video output device and said audio output device are connected in such a manner that the audio data is output from said audio-video output device to said audio output device through a network different from the network, said control message transmission unit is configured to prohibit re-transmitting the audio reproduction capability information to the audio-video reproduction device using the unidirectional transmission when transmitting the control message, and said reproduction unit reproduces the audio data in accordance with the audio reproduction capability information included in the control message received from said audio-video output device, when said audio-video reproduction device side control message reception unit receives the control message indicating that the audio reproduction capability information is used, instead of the audio reproduction capability information received from said audio-video output device through the unidirectional transmission.

6. An audio-video data reproduction method in an audio-video data reproduction system including:

an audio-video reproduction device which reproduces audio data and video data;

an audio output device which is capable of outputting the audio data reproduced by the audio-video reproduction device; and an audio-video output device capable of outputting the audio data and the video data reproduced by the audio-video reproduction device, wherein the audio-video reproduction device, the audio output device, and the audio-video output device are connected one another via a network, wherein, in the network:

(i) the audio data and the video data are unidirectionally transmitted from any given data transmission device to any given data reception device;

(ii) a control message is bidirectionally transmitted between all of the devices; and (iii) a connection between the devices for transmitting and receiving the audio data and the video data becomes valid when unidirectional transmission of audio reproduction capability information of the data reception device from the data reception device to the data transmission device becomes available, said audio-video data reproduction method comprises:

inquiring, from the audio output device, audio reproduction capability information of the audio output device and acquiring the audio reproduction capability information;

including, to the control message, the audio reproduction capability information of the audio output device and information setting whether audio reproduction capability indicated by the audio reproduction capability information is used or not, and transmitting the control message to the audio-video reproduction device; and including, to the control message, information setting whether or not the audio output device switches, to the audio-video reproduction device, the audio reproduction capability information by a unidirectional transmission, and transmitting the control message to the audio output device, in the network, when the audio-video reproduction device, the audio output device, and the audio-video output device are connected in such a manner that (i) the audio data and the video data is unidirectionally transmitted from the audio-video reproduction device to the audio output device and that (ii) the audio data and the video data is unidirectionally transmitted from the audio output device to the audio-video output device, said audio-video data reproduction method further comprises prohibiting the audio output device from re-transmitting the audio reproduction capability information to the audio-video reproduction device using unidirectional transmission, when the audio output device receives the control message transmitted by the audio-video output device side control message transmission unit, indicating that the audio reproduction capability information by the unidirectional transmission is not switched, in the case where, (i) in the network, the audio-video reproduction device and the audio-video output device are connected in such a manner that the audio data and the video data are unidirectionally transmitted from the audio-video reproduction device to the audio-video output device, and where (ii) the audio-video output device and the audio output device are connected in such a manner that the audio data is output from the audio-video output device to the audio output device through a network different from the network, and said audio-video data reproduction method further comprises:

prohibiting the audio-video output device from re-transmitting the audio reproduction capability information to the audio-video reproduction device using unidirectional transmission when transmitting the control message; and reproducing the audio data in accordance with the audio reproduction capability information included in the control message received from the audio-video output device, when the audio-video reproduction device receives the control message indicating that the audio reproduction capability information is used.

* * * * *